United States Patent
Wu et al.

(10) Patent No.: US 12,362,601 B2
(45) Date of Patent: Jul. 15, 2025

(54) WIRELESS POWER TRANSMITTER CIRCUIT AND METHOD CAPABLE OF DETECTING WIRELESS POWER RECEIVER AND FOREIGN OBJECT

(71) Applicant: Richtek Technology Corporation, Hsinchu (TW)

(72) Inventors: Wei-Shuo Wu, Kaohsiung (TW); Fu-Chi Lin, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 24 days.

(21) Appl. No.: 18/503,202

(22) Filed: Nov. 7, 2023

(65) Prior Publication Data
US 2025/0015641 A1    Jan. 9, 2025

(30) Foreign Application Priority Data
Jul. 6, 2023 (TW) ................. 112125199

(51) Int. Cl.
*H02J 50/60* (2016.01)
*H02J 50/12* (2016.01)

(52) U.S. Cl.
CPC ............. *H02J 50/60* (2016.02); *H02J 50/12* (2016.02)

(58) Field of Classification Search
CPC . H02J 50/60; H02J 50/12; H02J 50/80; H04B 5/79
See application file for complete search history.

(56) References Cited

U.S. PATENT DOCUMENTS

| | | | |
|---|---|---|---|
| 2019/0319495 A1* | 10/2019 | Park | H02J 50/10 |
| 2019/0379243 A1* | 12/2019 | Park | H02J 50/12 |
| 2022/0247217 A1* | 8/2022 | Alam | H02J 50/80 |

* cited by examiner

*Primary Examiner* — Lincoln D Donovan
*Assistant Examiner* — Alex W Lam
(74) *Attorney, Agent, or Firm* — Huan-Yi Lin

(57) ABSTRACT

A wireless power transmitter circuit includes: an inverter circuit including plural switches coupled to a resonant transmitter circuit; and a transmitter controller circuit for generating a PWM control signal, to control the plural switches, thus generating a wireless transmission power via the resonant transmitter circuit in a power supply procedure, so that a wireless power supply is accordingly provided to a wireless power receiver circuit. In a groping procedure, transmitter controller circuit controls the plural switches to generate a wireless test power via the resonant transmitter circuit based on an operation frequency. The groping procedure includes: measuring a peak of a transmission signal corresponding to the wireless test power; determining, according to the peak of the transmission signal, whether a foreign object exists and/or whether the wireless power receiver circuit is present. When it is determined that the wireless power receiver circuit is present, the power supply procedure is performed.

26 Claims, 22 Drawing Sheets

WIRELESS POWER TRANSMITTER CIRCUIT AND METHOD CAPABLE OF DETECTING WIRELESS POWER RECEIVER AND FOREIGN OBJECT

CROSS REFERENCE

The present invention claims priority to the TW patent application No. 112125199, filed on Jul. 6, 2023, which application is incorporated herein by its reference in its entirety.

BACKGROUND OF THE INVENTION

Field of Invention

The present invention relates to a wireless power transmitter circuit; particularly, it relates to such wireless power transmitter circuit capable of detecting a wireless power receiver circuit and a foreign object. The present invention also relates to a method configured to operably detect a wireless power receiver circuit and a foreign object.

Description of Related Art

Please refer to FIG. 1, which shows a schematic circuit diagram of a conventional foreign object detection sensor and a waveform corresponding to this conventional foreign object detection sensor. The conventional foreign object detection sensor shown in FIG. 1 includes: a detection winding 101 and a capacitor 102 which form a resonant tank circuitry. The aforementioned resonant tank circuitry is charged via an external power supply. Subsequent to the removal of the external power supply, electric energy stored in the resonant tank circuitry will oscillate between the detection winding 101 and the capacitor 102. Because electric energy will dissipate at the detection winding 101, the capacitor 102 or any other type of parasitic devices (e.g., a trace of a printed circuit board (PCB) or a performing wire), as shown by a right portion in FIG. 1, electric energy is attenuated as time passes by. As a result, in this case, the conventional foreign object detection sensor shown in FIG. 1 can accordingly determine and differentiate whether a receiver or a foreign object approaches close to the conventional foreign object detection sensor shown in FIG. 1. The prior art shown in FIG. 1 has the following drawbacks that: In order to determine and differentiate whether the receiver or the foreign object approaches close to the conventional foreign object detection sensor, it is required for the conventional foreign object detection sensor to adopt extra detection winding circuitries.

Please refer to FIG. 2, which illustrates resonant transmission diagrams depicting signals associated with the operation a conventional wireless power transmitter in a conventional wireless power transmission system, wherein a wireless power receiver is present. The conventional wireless power transmission system shown in FIG. 2 determines and differentiates whether a receiver or a foreign object approaches close to the conventional wireless power transmission system by measuring a natural response attenuation rate of a transmission signal.

In view of the above, to overcome the drawbacks in the above-mentioned two prior arts, the present invention proposes a wireless power receiver circuit without exploiting auxiliary detection winding circuitries.

SUMMARY OF THE INVENTION

From one perspective, the present invention provides a wireless power transmitter circuit, comprising: an inverter circuit which includes a plurality of switches, wherein the inverter circuit is coupled to a resonant transmitter circuit, wherein the resonant a transmitter circuit includes: transmission winding and a resonant capacitor which are coupled to each other; and a transmitter controller circuit, which is configured to operably generate a pulse width modulation (PWM) control signal, so as to control the plurality of switches, thus generating a wireless transmission power via the resonant transmitter circuit in a power supply procedure S700, so that a wireless power supply is accordingly provided to a corresponding wireless power receiver circuit, wherein in a groping procedure, the transmitter controller circuit is further configured to operably control the plurality of switches to generate a wireless test power via the resonant transmitter circuit based upon an operation frequency; wherein according to a transmission signal, the transmitter controller circuit is further configured to operably determine whether a foreign object is present and/or whether the wireless power receiver circuit is present, wherein the transmission signal is related to a voltage in between the resonant capacitor and the transmission winding; wherein there is an offset frequency, which is not equal to zero, between the operation frequency and an intrinsic resonant frequency of the resonant transmitter circuit; wherein the groping procedure includes the following steps: a step S100: measuring a peak of the transmission signal corresponding to the wireless test power; wherein the groping procedure further includes the following steps: a step S250: determining whether the foreign object is present according to the peak of the transmission signal; and/or a step S350: determining whether the wireless power receiver circuit is present according to the peak of the transmission signal, wherein when it is determined that the wireless power receiver circuit is indeed present, performing the power supply procedure S700.

From another perspective, the present invention provides a method, which is configured to operably detect a wireless power receiver circuit and a foreign object; the method comprising the following steps: in a power supply procedure S700, controlling a resonant transmitter circuit to generate a wireless transmission power, so that a wireless power supply is accordingly provided to a corresponding wireless power receiver circuit; and in a groping procedure, controlling a resonant transmitter circuit to generate a wireless test power based upon an operation frequency; and determining whether a foreign object is present and/or whether the wireless power receiver circuit is present according to a transmission signal of the resonant transmitter circuit; wherein there is an offset frequency, which is not equal to zero, between the operation frequency and an intrinsic resonant frequency of the resonant transmitter circuit; wherein the groping procedure includes the following steps: a step S100: measuring a peak of the transmission signal corresponding to the wireless test power; wherein the groping procedure further includes the following steps: a step S250: determining whether the foreign object is present according to the peak of the transmission signal; and/or a step S350: determining whether the wireless power receiver circuit is present according to the peak of the transmission signal, wherein when it is determined that the wireless power receiver circuit is indeed present, performing the power supply procedure S700.

In one embodiment, the step S250 includes the following steps: a step S200: determining whether the foreign object is present according to whether the peak of the transmission signal exceeds a foreign object peak threshold; and/or a step S300: determining whether the foreign object is present according to whether a peak-frequency variation rate which reflects change rate of the peak of the transmission signal against the operation frequency exceeds a foreign object variation rate threshold.

In one embodiment, the step S350 includes the following steps: a step S500: determining whether the wireless power receiver circuit is present according to whether the peak of the transmission signal exceeds a receiving peak threshold; and/or a step S600: determining whether the wireless power receiver circuit is present according to whether the peak-frequency variation rate which reflects change rate of the peak of the transmission signal against the operation frequency exceeds a receiving variation rate threshold.

In one embodiment, when the foreign object is present, the resonant transmitter circuit has a first response resonant frequency, and, when the wireless power receiver circuit is present, the resonant transmitter circuit has a second response resonant frequency, wherein the first response resonant frequency and the second response resonant frequency are respectively located at opposite sides of the intrinsic resonant frequency.

In one embodiment, the first response resonant frequency is higher than the intrinsic resonant frequency, and, the intrinsic resonant frequency is higher than the second response resonant frequency.

In one embodiment, wherein: the step S200 further includes the following steps: determining whether the foreign object is present according to whether the peak of the transmission signal is greater than the foreign object peak threshold; and
   the step S500 further includes the following steps: determining whether the wireless power receiver circuit is present according to whether the peak of the transmission signal is smaller than the receiving peak threshold; wherein the receiving peak threshold is smaller than the foreign object peak threshold.

In one embodiment, wherein: the step S300 further includes the following steps: determining whether the foreign object is present according to whether an absolute value of the peak-frequency variation rate which reflects change rate of the peak of the transmission signal against the operation frequency is greater than an absolute value of the foreign object variation rate threshold; and the step S600 further includes the following steps: determining whether the wireless power receiver circuit is present according to whether an absolute value of the peak of the transmission signal is smaller than an absolute value of the receiving peak threshold;
   wherein the absolute value of the receiving peak threshold is smaller than the absolute value of the foreign object peak threshold.

In one embodiment, the peak-frequency variation rate which reflects change rate of the peak of the transmission signal against the operation frequency is a quotient of a first difference divided by a second difference, wherein the first difference is a difference between a peak of a first transmission signal corresponding to a first operation frequency and a peak of a second transmission signal corresponding to a second operation frequency, and the second difference is a difference between the first operation frequency and the second operation frequency.

In one embodiment, the first operation frequency is same as the operation frequency, such that the first transmission signal peak is the peak of the transmission signal.

In one embodiment, when the step S250 determines that the foreign object is present, returning to the step S100.

In one embodiment, the groping procedure further includes the following steps: a foreign object operation step S400, wherein when the step S250 determines that the foreign object is present, the foreign object operation step S400 is further performed before returning to the step S100, wherein the foreign object operation step S400 includes the following steps: adding a delay time; and/or reducing a power level of the wireless test power.

In one embodiment, when the step S300 determines that the foreign object is absent and the step S600 determines that the wireless power receiver circuit is absent, returning to the step S100.

In one embodiment, the groping procedure further includes the following steps: a step S900, wherein when the step S300 determines that the foreign object is absent and the step S600 determines that the wireless power receiver circuit is absent, the step S900 is further performed before returning to the step S100, wherein the step S900 includes the following steps: increasing a power level of the wireless test power.

In one embodiment, the groping procedure further includes the following steps: a step S800, wherein when the step S300 determines that the foreign object is absent and the step S600 determines that the wireless power receiver circuit is absent, the step S800 is further performed before returning to the step S100 or entering the step S900, wherein the step S800 includes the following steps: accumulating a cumulative number; and entering the step S900 if the cumulative number is greater than a preset count threshold, or otherwise returning to the step S100.

Advantages of the present invention include: that, the present invention can detect a foreign object and a wireless power receiver circuit by simply adopting a simplified circuitry of a wireless power transmission winding without exploiting auxilliary detection winding circuitries; and that, the present invention can only detect a stable peak transmitted by a low power without awakening a wireless power receiver circuit, so it is more easily for the present invention to accomplish the detection of a foreign object and a wireless power receiver circuit.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
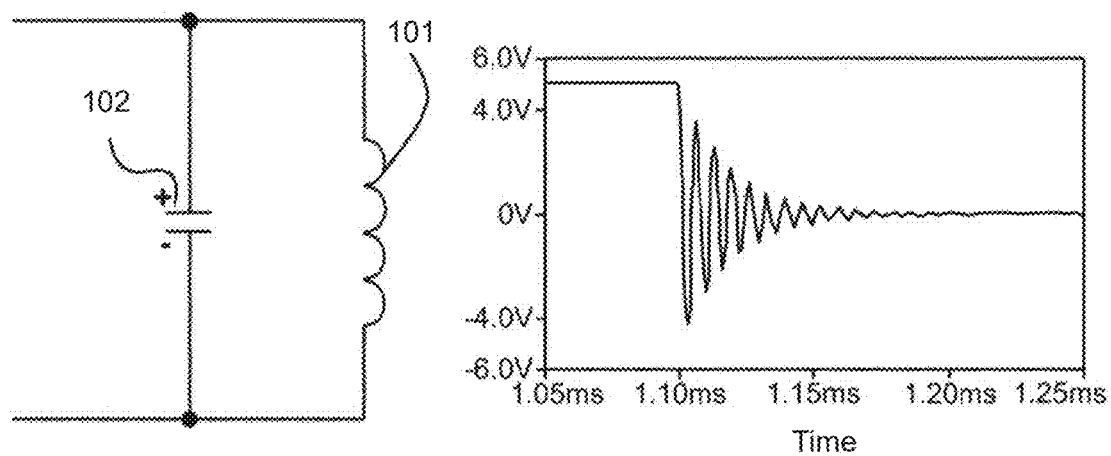
FIG. 1 shows a schematic circuit diagram of a conventional foreign object detection sensor and a waveform corresponding to this conventional foreign object detection sensor.
Figure 2:
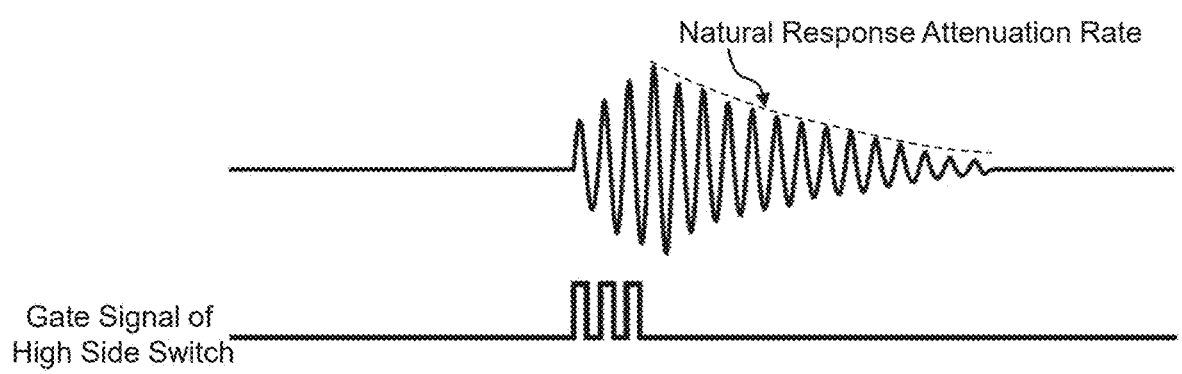
FIG. 2 illustrates resonant transmission diagrams depicting signals associated with the operation a conventional wireless power transmitter in a conventional wireless power transmission system, wherein a wireless power receiver is present.
Figure 3:
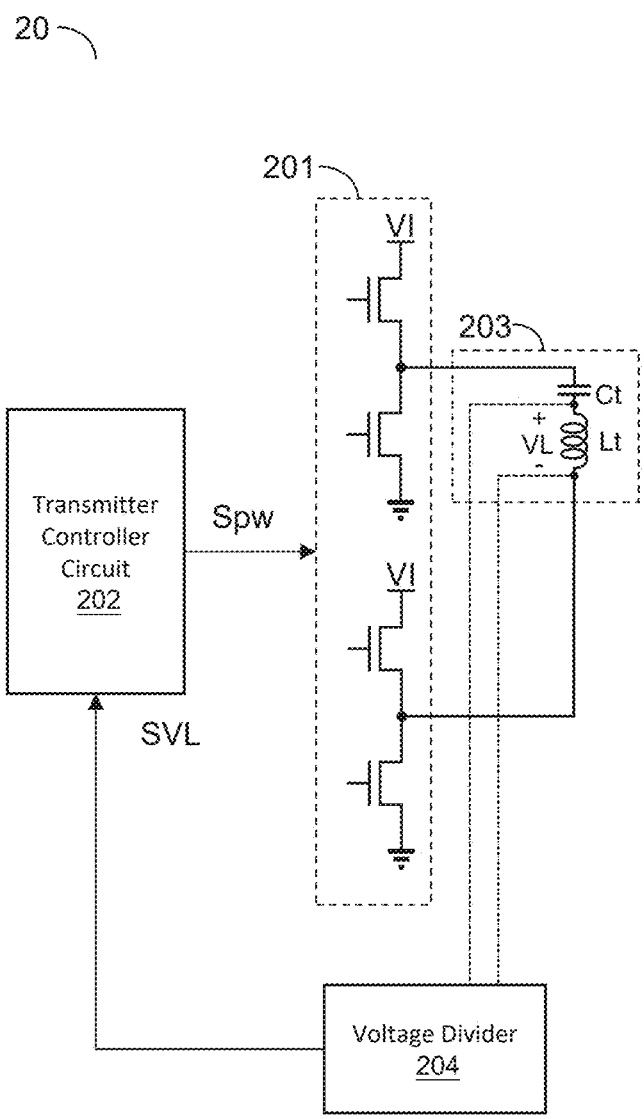
FIG. 3 shows a circuit block diagram of a wireless power transmitter circuit according to an embodiment of the present invention.
Figure 5:
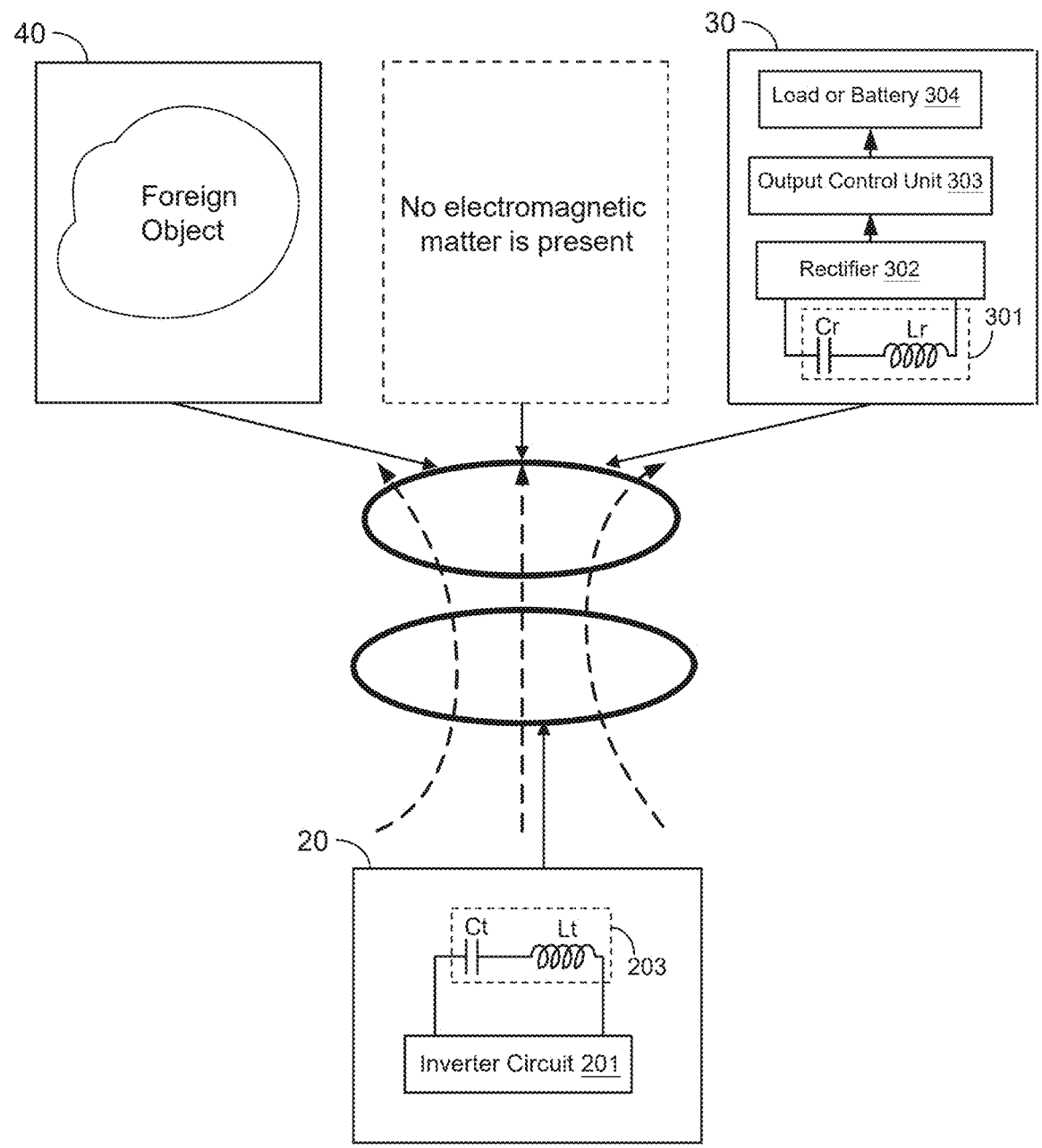
FIG. 5 shows a schematic diagram depicting a situation where a wireless power transmitter circuit according to an embodiment of the present invention is in numerous different scenarios.

Please refer to FIG. 3, which shows a circuit block diagram of a wireless power transmitter circuit according to an embodiment of the present invention. As shown in FIG. 3, in one embodiment, the wireless power transmitter circuit 20 comprises: an inverter circuit 201, a resonant transmitter circuit 203, a transmitter controller circuit 202 and a voltage divider 204. In one embodiment, the inverter circuit 201 can be for example a half-bridge inverter circuit as shown in FIG. 3. Or, in an alternative embodiment, the inverter circuit 201 can be for example a full-bridge inverter circuit or any other types of inverter circuits. The inverter circuit 201 includes: plural of switches which are coupled to the resonant transmitter circuit 203. The resonant transmitter circuit 203 includes: a transmission winding Lt (which can be considered as an inductor) and a resonant capacitor Ct which are coupled to each other. Referring to FIG. 3 along with FIG. 5, in one embodiment, in a power supply procedure S700 (note that in regard to a reference sign "S700", please refer to FIG. 3 along with FIG. 12A), the transmitter controller circuit 202 is configured to operably generate a pulse width modulation (PWM) control signal Spw to control the plural switches, so as to convert a direct current (DC) power supply VI to generate a wireless transmission power via the resonant transmitter circuit 203 for powering a corresponding wireless power receiver circuit 30 wirelessly (as shown in FIG. 5). On the other hand, in a groping procedure, the transmitter controller circuit 202 is further configured to operably control the plural switches to generate a wireless test power via the resonant transmitter circuit 203 based upon an operation frequency. Moreover, according to a transmission signal, the transmitter controller circuit 202 is further configured to operably determine whether a foreign object is present and/or whether the wireless power receiver circuit 30 is present. As for detailed operation steps of the aforementioned "groping procedure", please refer to the detailed description of the embodiments below. In one embodiment, the transmission signal is related to a voltage across the transmission winding Lt. In one embodiment, preferably, the transmission signal is literally the voltage VL in between the resonant capacitor Cr and the transmission winding Lt. The voltage divider 204 is configured to operably generate a sensing voltage signal SVL in accordance with the voltage VL in between the resonant capacitor Cr and the transmission winding Lt, wherein the sensing voltage signal SVL is subsequently provided to the transmitter controller circuit 202. In one embodiment, the sensing voltage signal SVL is related to the voltage VL in between the resonant capacitor Cr and the transmission winding Lt.

Figure 4A:
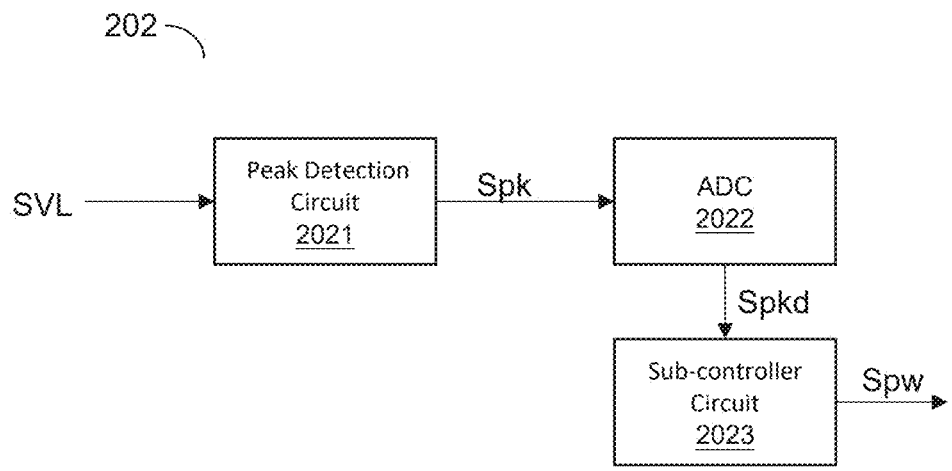
FIG. 4A shows a circuit block diagram of a transmitter controller circuit in a wireless power transmitter circuit according to an embodiment of the present invention.

FIG. 4A shows a circuit block diagram of a transmitter controller circuit in a wireless power transmitter circuit according to an embodiment of the present invention. This embodiment is literally an exemplary embodiment. As shown in FIG. 4a, in one embodiment, the transmitter controller circuit 202 includes: a peak detection circuit 2021, an analog-to-digital converter (ADC) 2022 and a sub-controller circuit 2023. The peak detection circuit 2021 is configured to operably detect a peak of the sensing voltage signal SVL, so as to generate an analog voltage signal Spk. The ADC 2022 is configured to operably convert the analog peak voltage signal Spk to a digital peak voltage signal Spkd. The sub-controller circuit 2023 is configured to operably generate the PWM control signal Spw according to the digital peak voltage signal Spkd.

Figure 4B:
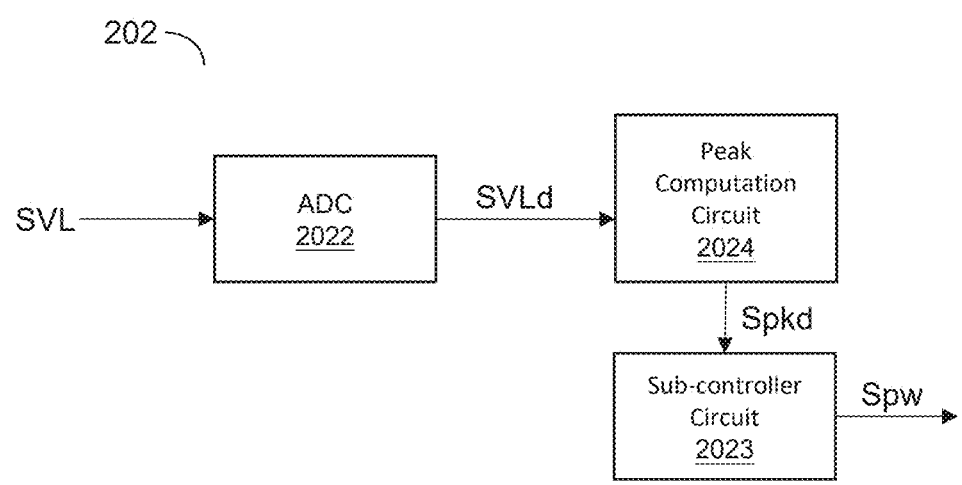
FIG. 4B shows a circuit block diagram of a transmitter controller circuit in a wireless power transmitter circuit according to another embodiment of the present invention.

FIG. 4B shows a circuit block diagram of a transmitter controller circuit in a wireless power transmitter circuit according to another embodiment of the present invention. This embodiment is literally an exemplary embodiment. As shown in FIG. 4B, in another embodiment, the transmitter controller circuit 202 includes: an ADC 2022, a peak computation circuit 2024 and a sub-controller circuit 2023. The ADC 2022 is configured to operably convert an analog sensing voltage signal SVL to a digital sensing voltage signal SVLd. The peak computation circuit 2024 is configured to operably compute a peak of the digital sensing voltage signal SVLd to generate the digital peak voltage signal Spkd. The sub-controller circuit 2023 is configured to operably generate a PWM control signal Spw according to the digital peak voltage signal Spkd.

FIG. 5 shows a schematic diagram depicting a situation where a wireless power transmitter circuit according to an embodiment of the present invention is in numerous different scenarios. As shown in FIG. 5, a top oval area indicates a receiver end, and, a bottom oval area indicates a transmitter end. On one hand, there may be three different scenarios for the receiver end. For example, the receiver end can be a receiving winding Lr in the wireless power receiver circuit 30, a foreign object 40 or not existing any electromagnetic matter. It is noteworthy that, as one having ordinary skill in the art readily understands, the term "foreign object 40", as may be used herein, refers to: a non-wireless power receiver circuit having electromagnetic characteristic. On the other hand, the transmitter end can be for example a transmission winding Lt in the wireless power transmitter circuit 20. In one embodiment, the wireless power receiver circuit 30 includes: a resonant receiver circuit 301, a rectifier 302, an output control unit 303, and a load/a battery 304. In this embodiment, the resonant receiver circuit 301 is configured to operably receive a wireless transmission power generated by the resonant transmitter circuit 203. Subsequently, after being rectified via the rectifier 302, the accordingly rectified wireless transmission power serves to provide power supply to the load/the battery 304 via the output control unit 303. The resonant receiver circuit 301 includes: the receiving winding Lr (which can be considered as an inductor) and a resonant capacitor Cr which are coupled to each other. In one embodiment, it is also practicable for the resonant transmitter circuit 203 and the resonant receiver circuit 301 to perform in-band communication.

Figure 6:
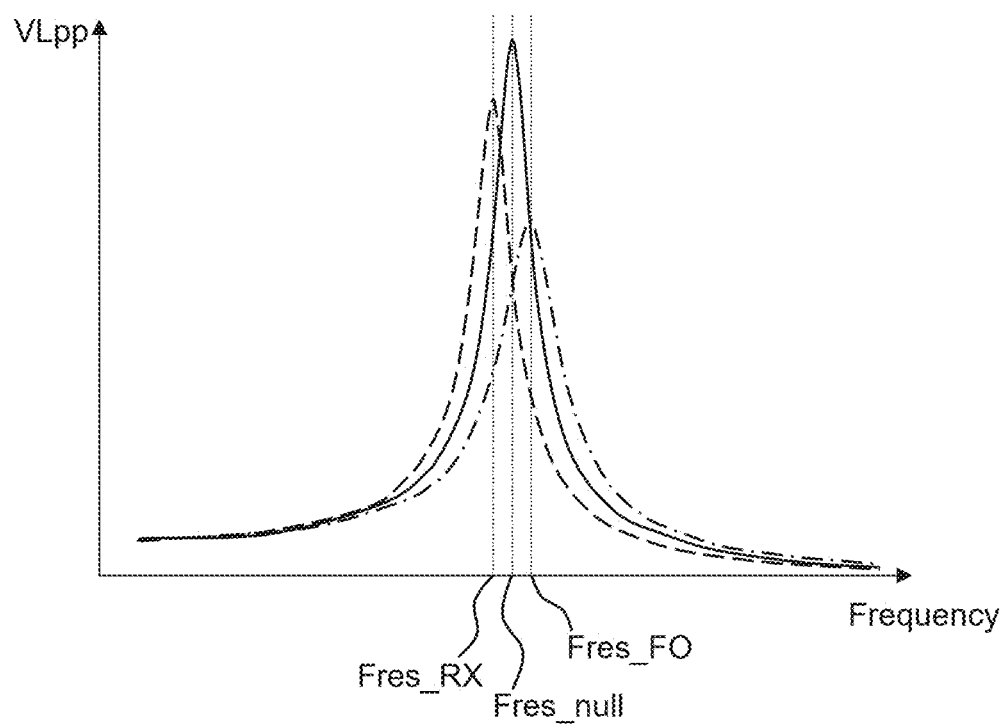
FIG. 6 shows a frequency response diagram of a peak of a voltage in between the resonant capacitor and the transmission winding in a wireless power transmitter circuit according to an embodiment of the present invention.

FIG. 6 shows a frequency response diagram of a peak of a voltage in between the resonant capacitor and the transmission winding in a wireless power transmitter circuit according to an embodiment of the present invention. As shown in FIG. 6 along with FIG. 5, in one embodiment, a dash-dotted line indicates a frequency response curve of the peak of the voltage VL in between the resonant capacitor Cr and the transmission winding Lt (i.e., VLpp) when a foreign object 40 (referring to FIG. 5) is present. A solid line indicates a frequency response curve of the peak of the voltage VL in between the resonant capacitor Cr and the transmission winding Lt (i.e., VLpp) when no electromagnetic matter (referring to FIG. 5) is present. A dashed line indicates a frequency response curve of the peak of the voltage VL in between the resonant capacitor Cr and the transmission winding Lt (i.e., VLpp) when a wireless power receiver circuit 30 (referring to FIG. 5) is present. As shown in FIG. 6 along with FIG. 5, when the foreign object 40 is present, the resonant transmitter circuit 203 has a first response resonant frequency Fres_FO, and, when the wireless power receiver circuit 30 is present, the resonant transmitter circuit 203 has a second response resonant frequency Fres_RX. As shown in FIG. 6, in one embodiment, the first response resonant frequency Fres_FO and the second response resonant frequency Fres_RX are respectively located at opposite sides of the intrinsic resonant frequency Fres_null. When no electromagnetic matter (referring to FIG. 5) is present, a corresponding intrinsic resonant frequency Fres_null can be represented by the following equation:

$$Fres\_null = \frac{1}{2\pi\sqrt{Lt \times Ct}}.$$

In one embodiment, as described in FIG. 6, the first response resonant frequency Fres_FO is higher than the second response resonant frequency Fres_RX. In another embodiment, the second response resonant frequency Fres_RX is higher than first response resonant frequency Fres_FO.

Because the resonant transmitter circuit 203 has different response resonant frequencies and different Q values (i.e., different quality factors) as the receiver end is under different scenarios, the present invention can determine under which scenario the receiver end is according to characteristics (e.g., a peak of the transmission signal or a peak-frequency variation rate of the transmission signal, and so on) of the transmission signal measured by the resonant transmitter circuit 203 operating at one or plural operation frequency. The detailed description of the embodiments pertinent to the aforementioned mechanism will be elaborated in detail later.

Figure 7:
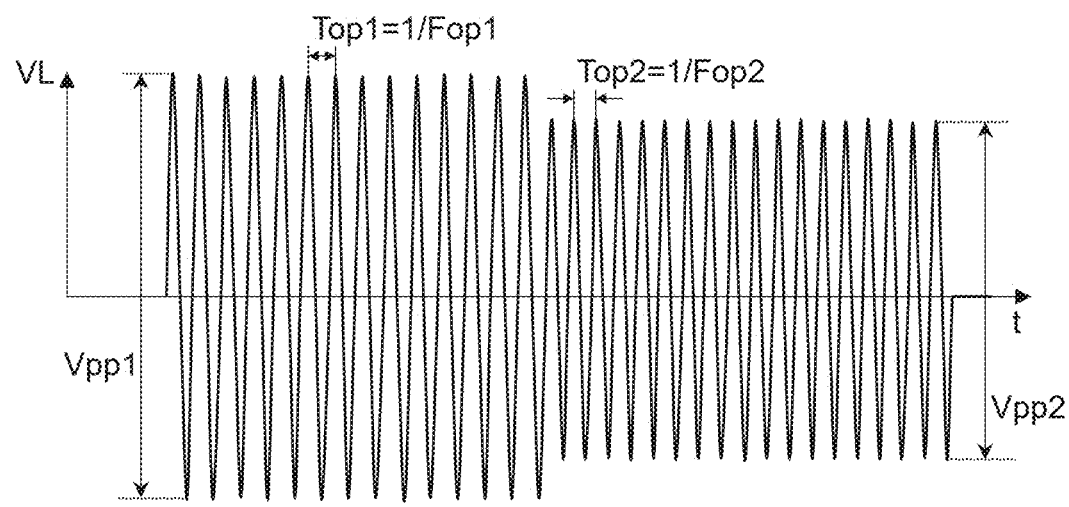
FIG. 7 illustrates signal waveform diagrams depicting measured transmission signals (i.e., a voltage in between the resonant capacitor and the transmission winding) associated with the operation where a wireless power transmitter circuit transmits a wireless test power during a groping procedure according to an embodiment of the present invention.

FIG. 7 illustrates signal waveform diagrams depicting measured transmission signals (i.e., a voltage in between the resonant capacitor and the transmission winding) when the wireless power transmitter circuit transmits a wireless test power during a groping procedure according to an embodiment of the present invention. Please refer to FIG. 7 along with FIG. 5, in this embodiment, the voltage VL in between the resonant capacitor Cr and the transmission winding Lt (referring to FIG. 5), a first peak-to-peak voltage Vpp1, a second peak-to-peak voltage Vpp2, a first operation period Top1 and a second operation period Top2 are illustrated in FIG. 7. In one embodiment, when the wireless power transmitter circuit 20 is configured to transmit a wireless test power in a groping procedure, the groping procedure includes a first stage and a second stage. During the first stage, the wireless power transmitter circuit 20 is configured to operably transmit the wireless test power based upon the first operation period Top1 (corresponding to a first operation frequency Fop1), and, during the second stage, the wireless power transmitter circuit 20 is configured to operably transmit the wireless test power based upon the second operation period Top2 (corresponding to a second operation frequency Fop2). There is an offset frequency, which is not equal to zero, between the first operation frequency Fop1 and the intrinsic resonant frequency Fres_null of the resonant transmitter circuit. Likewise, there is an offset frequency, which is not equal to zero, between the second operation frequency Fop2 and the intrinsic resonant frequency Fres_null of the resonant transmitter circuit. In this embodiment, since the first operation period Top1 (corresponding to the first operation frequency Fop1) is different from the second operation period Top2 (corresponding to the second operation frequency Fop2), the first peak-to-peak voltage Vpp1 and the second peak-to-peak voltage Vpp2 of the voltage VL in between the resonant capacitor Cr and the transmission winding Lt, during the first stage and the second stage respectively, are therefore different from each other.

Figure 8:
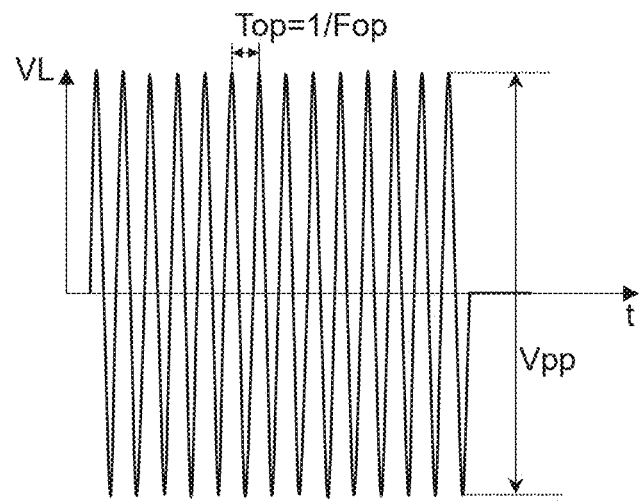
FIG. 8 illustrates signal waveform diagrams depicting measured transmission signals (i.e., a voltage in between the resonant capacitor and the transmission winding) associated with the operation where a wireless power transmitter circuit transmits a wireless test power during a groping procedure according to another embodiment of the present invention.

FIG. 8 illustrates signal waveform diagrams depicting measured transmission signals (i.e., a voltage in between the resonant capacitor and the transmission winding) associated with the operation where a wireless power transmitter circuit transmits a wireless test power during a groping procedure according to another embodiment of the present invention. In this embodiment, when the wireless power transmitter circuit 20 is configured to operably transmit a wireless test power in a groping procedure, the groping procedure has only one single test stage. In this circumstance, during the test stage, the wireless power transmitter circuit 20 is configured to operably transmit the wireless test power based upon the operation period Top (corresponding to an operation frequency Fop), wherein the voltage VL in between the resonant capacitor Cr and the transmission winding Lt (referring to FIG. 5), a peak-to-peak voltage Vpp and the operation period Top are illustrated in FIG. 8.

Figure 9:
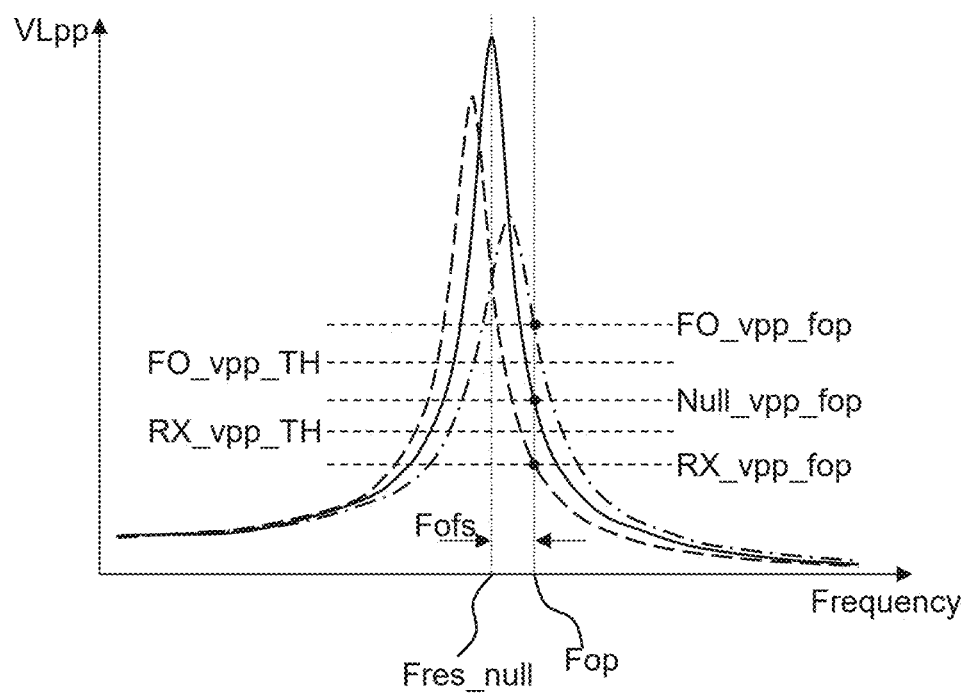
FIG. 9 and FIG. 10A respectively show two schematic response diagrams depicting frequency response of a peak of a voltage in between the resonant capacitor and the transmission winding in a wireless power transmitter circuit according to two different embodiments of the present invention.
Figure 11A:
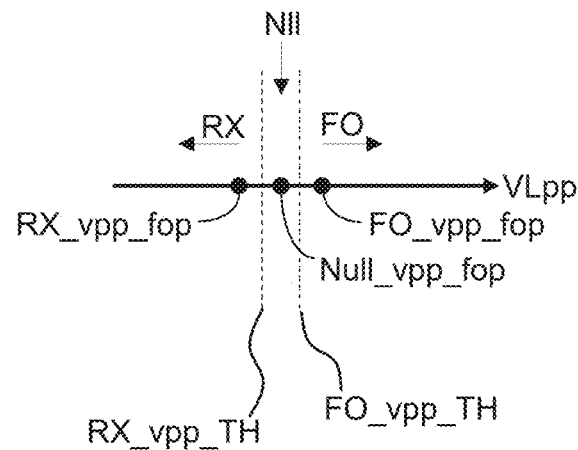
FIG. 11A shows a schematic diagram depicting determination zones in association with a peak of a voltage in between the resonant capacitor and the transmission winding in a wireless power transmitter circuit according to an embodiment of the present invention.

Please refer to FIG. 8 along with FIG. 5, FIG. 9 and FIG. 11A. FIG. 9 shows a frequency response diagram of a peak of a voltage in between the resonant capacitor and the transmission winding in a wireless power transmitter circuit according to an embodiment of the present invention. FIG. 11A shows a schematic diagram depicting determination zones in association with a peak of a voltage in between the resonant capacitor and the transmission winding in a wireless power transmitter circuit according to an embodiment of the present invention. In one embodiment, as shown in FIG. 9, the wireless power transmitter circuit 20 can in advance measure to acquire a foreign object peak threshold FO_vpp_TH and/or a receiving peak threshold RX_vpp_TH. Subsequently, the present invention can determine under which scenario the receiver end is according to different scale relationships between the peak of the voltage in between the resonant capacitor Cr and the transmission winding Lt, VLpp (i.e., also referred as the peak of transmission signal VLpp), of the wireless power transmitter circuit 20 and such thresholds.

Please still refer to FIG. 5 along with FIG. 9 and FIG. 11A. In one embodiment, there is an offset frequency, which is not equal to zero, between the operation frequency Fop and an intrinsic resonant frequency Fres_null of the resonant transmitter circuit 203. When the peak of the voltage VL in between the resonant capacitor Cr and the transmission winding Lt (i.e., also referred as "the peak of transmission signal VLpp") is for example at the level of a peak of a voltage in between the resonant capacitor Cr and the transmission winding Lt, FO_vpp_fop, which exceeds (for example but not limited to "greater than") a foreign object peak threshold FO_vpp_TH, a foreign object (FO) is determined to be present. It is noteworthy that, as one having ordinary skill in the art readily understands, the term "is present", as may be used herein, refers to: a foreign object (e.g., 40 as shown in FIG. 5) having electromagnetic characteristics approaches to the transmission winding Lt (referring to FIG. 5) close to an extent that the peak of transmission signal VLpp is varied to exceed the foreign object peak threshold FO_vpp_TH.

On the other hand, when the peak of transmission signal VLpp is for example at a level of a peak of a voltage in between the resonant capacitor Cr and the transmission winding Lt, RX_vpp_fop, which exceeds (for example but not limited to "smaller than") a receiving peak threshold RX_vpp_TH, a wireless power receiver circuit 30 is determined to be present (RX). In an alternative embodiment, when the peak of the voltage in between the resonant capacitor Cr and the transmission winding Lt, VLpp, is for example at a level of a peak of a voltage in between the resonant capacitor Cr and the transmission winding Lt, Null_vpp_fop, which lies between the foreign object peak threshold FO_vpp_TH and the receiving peak threshold RX_vpp_TH, it is determined that no electromagnetic matter (referring to FIG. 5) is present (Nll).

Figure 10A:
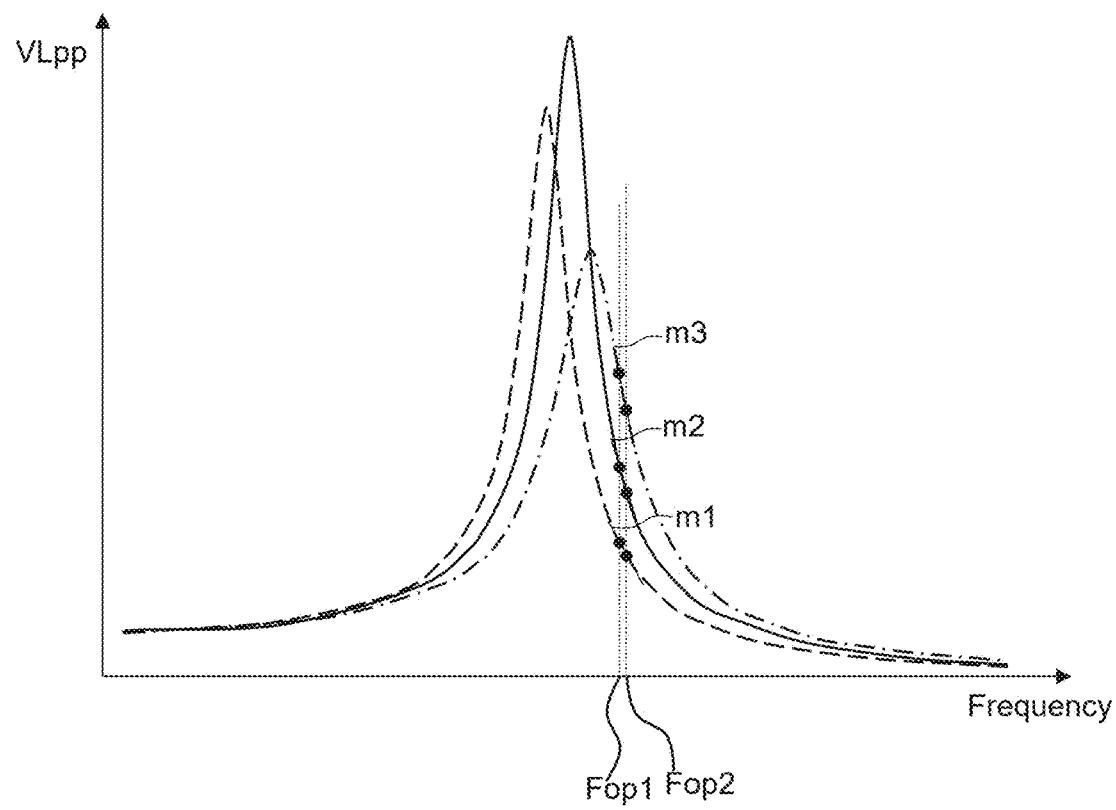
Figure 10B:
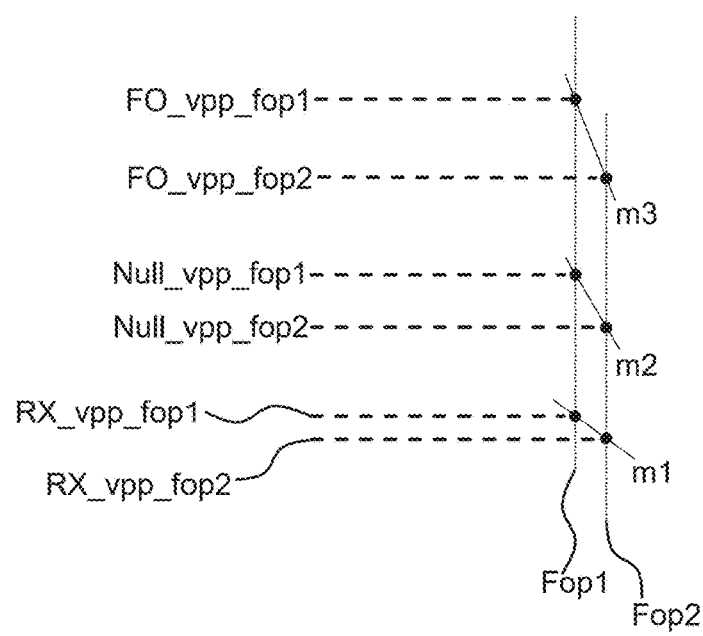
FIG. 10B is a zoomed diagram of FIG. 10A according to an embodiment of the present invention.
Figure 11B:
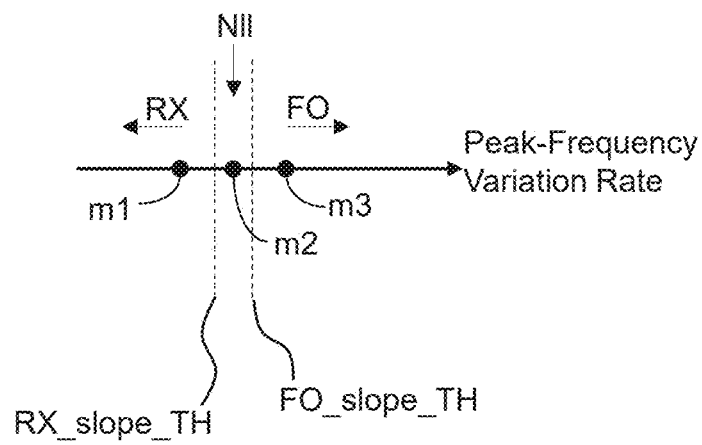
FIG. 11B shows a schematic diagram depicting determination zones in association with a variation rate of a frequency with regard to a peak of a voltage in between the resonant capacitor and the transmission winding in a wireless power transmitter circuit according to an embodiment of the present invention.

Please refer to FIG. 7 along with FIG. 5, FIG. 10A, FIG. 10B and FIG. 11B. FIG. 10A shows a frequency response diagram of a peak of a voltage in between the resonant capacitor and the transmission winding in a wireless power transmitter circuit according to another embodiment of the present invention. FIG. 10B is a zoomed diagram of FIG. 10A according to an embodiment of the present invention. FIG. 11B shows a schematic diagram depicting determination zones in association with a variation rate, against frequency, of a peak of a voltage in between the resonant capacitor and the transmission winding in a wireless power transmitter circuit according to an embodiment of the present invention. In one embodiment, as shown in FIG. 5, FIG. 10A, FIG. 10B and FIG. 11B, the wireless power transmitter circuit 20 (referring to FIG. 5) can in advance measure to acquire a foreign object variation rate threshold FO_slope_TH and/or a receiving variation rate threshold RX_slope_TH. Subsequently, the present invention can determine under which scenario the receiver end is according to a scale relationship between the peak-frequency variation rate of the operation frequency corresponding to the peak of the voltage in between the resonant capacitor Cr and the transmission winding Lt, VLpp (i.e., also referred as the peak of transmission signal VLpp), of the wireless power transmitter circuit 20 and such variation rate thresholds.

The aforementioned peak-frequency variation rate is a quotient of a first difference divided by a second difference, wherein the first difference is a difference between a peak of a first voltage in between the resonant capacitor Cr and the transmission winding Lt (i.e., also referred as "a peak of a first transmission signal") corresponding to a first operation frequency Fop1 and a peak of a second voltage in between the resonant capacitor Cr and the transmission winding Lt (i.e., also referred as "a peak of a second transmission signal") corresponding to a second operation frequency Fop2, wherein the second difference is a difference between the first operation frequency Fop1 and the second operation frequency Fop2. For example, as shown in FIG. 10A and FIG. 10B, a peak-frequency variation rate m1 is a quotient of a first difference divided by a second difference, wherein the first difference is a difference between a peak of a first voltage in between the resonant capacitor Cr and the transmission winding Lt, i.e., RX_vpp_fop1, corresponding to a first operation frequency Fop1 and a peak of a second voltage in between the resonant capacitor Cr and the transmission winding Lt, i.e., RX_vpp_fop2, corresponding to a second operation frequency Fop2, and the second difference is a difference between the first operation frequency Fop1 and the second operation frequency Fop2. Likewise, a peak-frequency variation rate m2 is a quotient of a first difference divided by a second difference, wherein the first difference is a difference between a peak of a first voltage in between the resonant capacitor Cr and the transmission winding Lt, i.e., Null_vpp_fop1, corresponding to a first operation frequency Fop1 and a peak of a second voltage in between the resonant capacitor Cr and the transmission winding Lt, i.e., Null_vpp_fop2, corresponding to a second operation frequency Fop2, wherein the second difference is a difference between the first operation frequency Fop1 and the second operation frequency Fop2. Likewise, a peak-frequency variation rate m3 is a quotient of a first difference divided by a second difference, wherein the first difference is a difference between a peak of a first voltage in between the resonant capacitor Cr and the transmission winding Lt, i.e., FO_vpp_fop1, corresponding to a first operation frequency Fop1 and a peak of a second voltage in between the resonant capacitor Cr and the transmission winding Lt, i.e., FO_vpp_fop2, corresponding to a second operation frequency Fop2, wherein the second difference is a difference between the first operation frequency Fop1 and the second operation frequency Fop2.

In one embodiment, when the above-mentioned peak-frequency variation rate is at the level of for example the peak-frequency variation rate m3 which exceeds (for example but not limited to "greater than") a foreign object variation rate threshold FO_slope_TH, a foreign object (FO) is determined to be present. When the above-mentioned peak-frequency variation rate is at the level of for example the peak-frequency variation rate m1 which exceeds (for example but not limited to "smaller than") a receiving variation rate threshold RX_slope_TH, a wireless power receiver circuit (RX) is determined to be present. When the above-mentioned peak-frequency variation rate is at the level of for example the peak-frequency variation rate m2 which lies between the foreign object variation rate threshold FO_slope_TH and the receiving variation rate threshold RX_slope_TH, it is determined that no electromagnetic matter (referring to FIG. 5) is present (Nll).

Figure 12A:
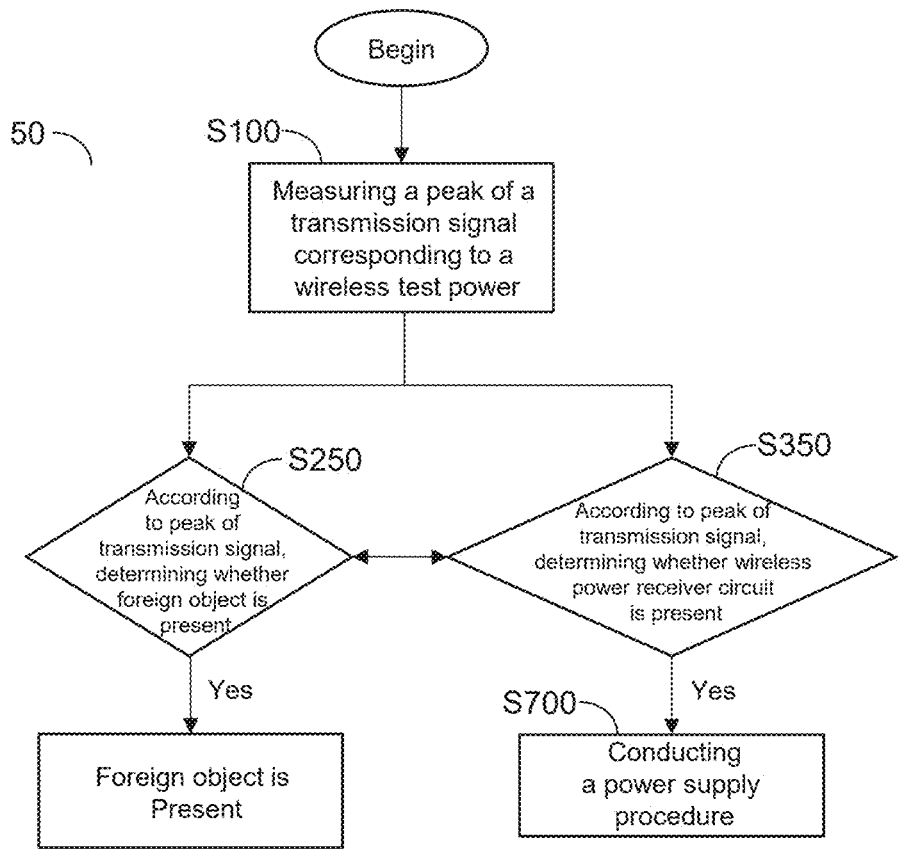
FIG. 12A to FIG. 12J, FIG. 13A to FIG. 13B, FIG. 14 and FIG. 15 are flowchart diagrams illustrating steps in association with a groping procedure of a wireless power transmitter circuit according to four different embodiments of the present invention.

FIG. 12A to FIG. 12J, FIG. 13A to FIG. 13B, FIG. 14 and FIG. 15 are flowchart diagrams illustrating steps in association with a groping procedure of a wireless power transmitter circuit according to four different embodiments of the present invention. As shown in FIG. 12A, the groping procedure 50 includes: a step S100 which includes: measuring a peak of a transmission signal corresponding to a wireless test power. Next, proceeding to a step S250 and/or a step S350. To be more specific, the step S250 includes: determining whether the foreign object is present according to the peak of the transmission signal. If it is determined that a result of the step S250 is yes, it indicates that a foreign object is present. If it is determined that a result of the step S250 is no and if the step S350 has not yet been executed, proceeding to the step S350. To be more specific, the step S350 includes: determining whether the wireless power receiver circuit is present according to the peak of the transmission signal, wherein when it is determined that the wireless power receiver circuit is indeed present, performing the power supply procedure S700. If it is determined that a result of the step S350 is no and if the step S250 has not yet been executed, proceeding to the step S250. In one embodiment, the power supply procedure S700 can further include: a digital groping procedure.

Figure 12B:
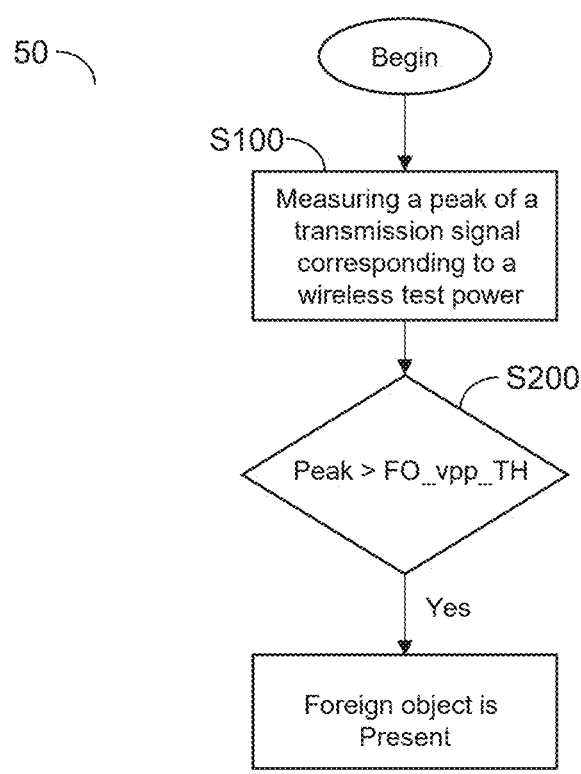
Figure 12C:
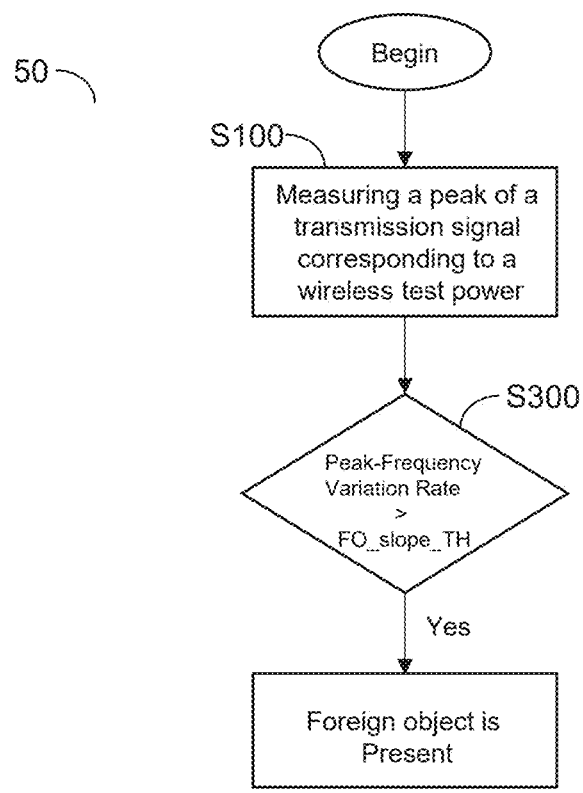

As shown in FIG. 12B, in another embodiment, the groping procedure 50 includes: a step S100, wherein the step S100 includes: measuring a peak of a transmission signal corresponding to a wireless test power. Next, proceeding to a step S200. To be more specific, the step S200 includes: determining whether the foreign object is present according to whether the peak of the transmission signal exceeds (for example but not limited to "greater than") a foreign object peak threshold FO_vpp_TH. If it is determined that a result of the step S200 is yes, it indicates that a foreign object is present. The embodiment of FIG. 12C is similar the embodiment shown in FIG. 12B, but is different in that: this embodiment shown in FIG. 12C replaces the step S200 by a step S300. To be more specific, the step S300 includes: determining whether the foreign object is present according to whether a peak-frequency variation rate which reflects change rate of the peak of the transmission signal against the operation frequency exceeds (for example but not limited to "greater than") a foreign object variation rate threshold FO_slope_TH. The rest steps of this embodiment shown in FIG. 12C are similar to the embodiment shown in FIG. 12B, so the details thereof are not redundantly repeated here.

Figure 12D:
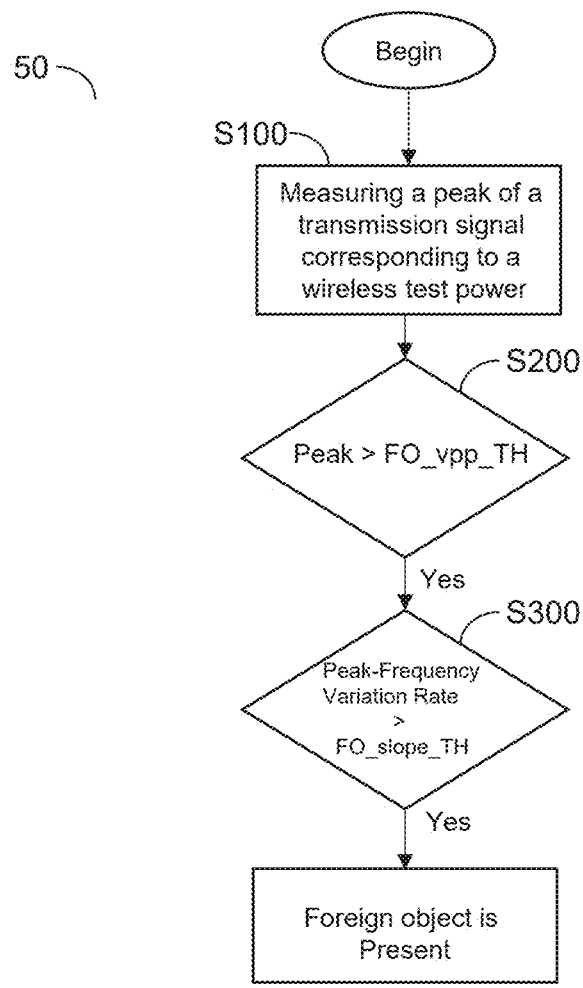
Figure 12E:
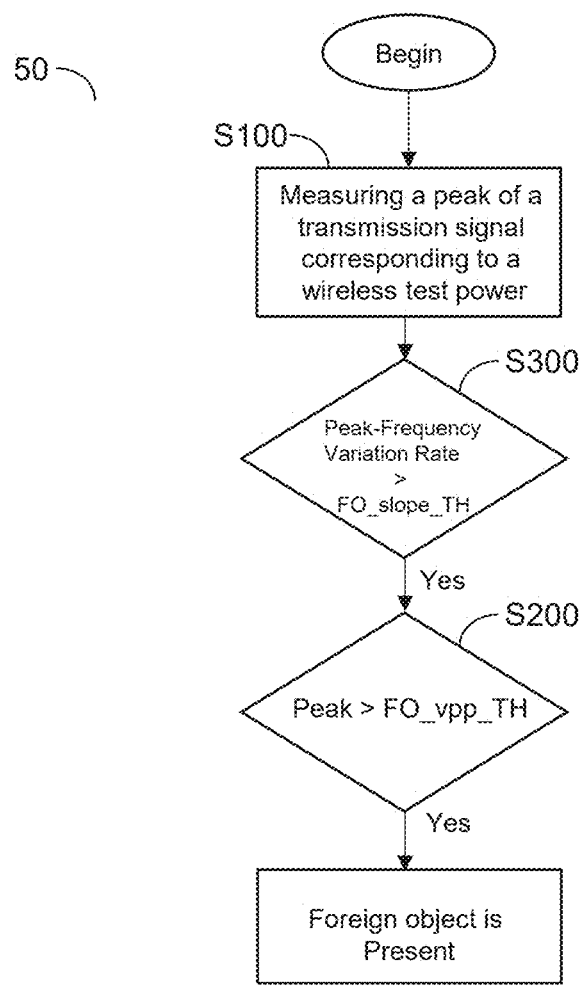

As shown in FIG. 12D, the embodiment shown in Fig. FIG. 12D is similar to the embodiment shown in FIG. 12B, but is different in that: this embodiment shown in Fig. FIG. 12D, subsequent to a step S200, further includes: a step S300. To be more specific, the step S300 includes: determining whether the foreign object is present according to whether a peak-frequency variation rate which reflects change rate of the peak of the transmission signal against the operation frequency exceeds (for example but not limited to "greater than") a foreign object variation rate threshold FO_slope_TH. The rest steps of this embodiment shown in FIG. 12D are similar to the embodiment shown in FIG. 12B, so the details thereof are not redundantly repeated here. As shown in FIG. 12E, the embodiment shown in FIG. 12E is similar to the embodiment shown in FIG. 12B, but is different in that: this embodiment shown in FIG. 12E, prior to a step S200 and subsequent to a step S100, further includes a step S300. To be more specific, the step S300 includes: determining whether the foreign object is present according to whether a peak-frequency variation rate which reflects change rate of the peak of the transmission signal against the operation frequency exceeds (for example but not limited to "greater than") a foreign object variation rate threshold FO_slope_TH. If it is determined that a result of the step S300 is yes, proceeding to the step S200. The rest steps of this embodiment shown in FIG. 12E are similar to the embodiment shown in FIG. 12B, so the details thereof are not redundantly repeated here.

Figure 12F:
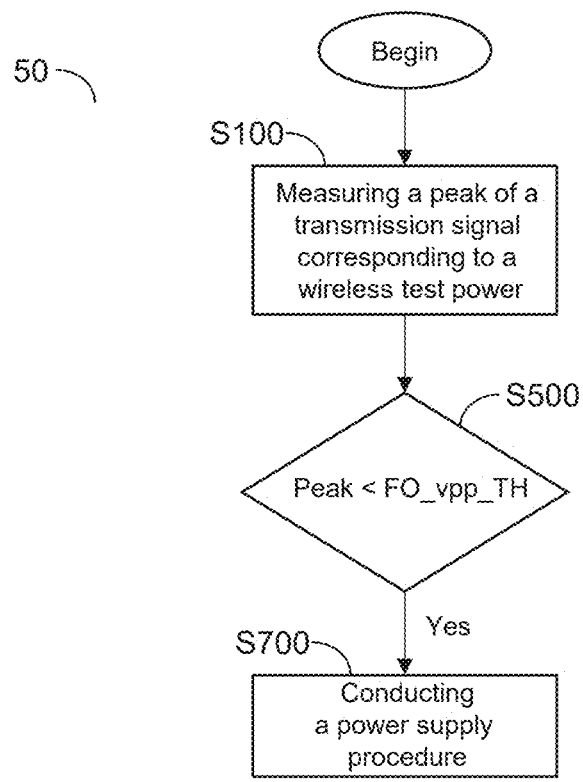
Figure 12G:
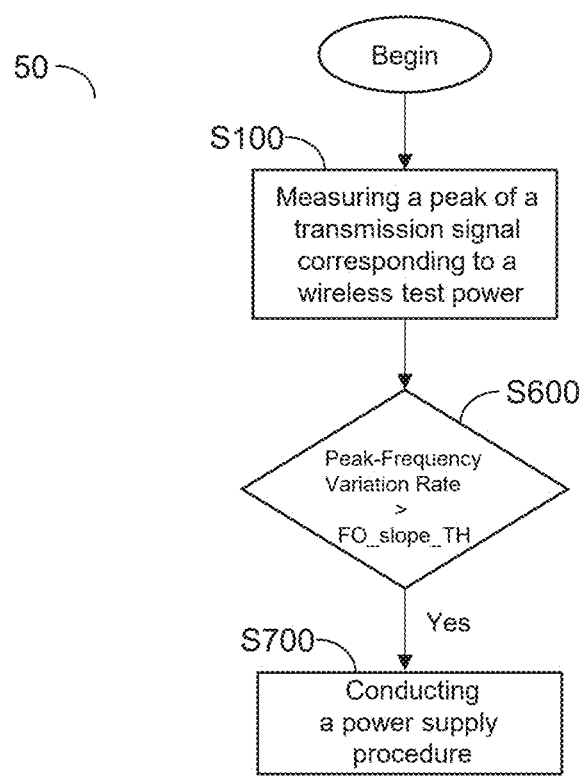

As shown in FIG. 12F, in yet another embodiment, the groping procedure 50 includes: a step S100, wherein the step S100 includes: measuring a peak of a transmission signal corresponding to a wireless test power. Next, proceeding to a step S500. To be more specific, the step S500 includes: determining whether the wireless power receiver circuit is present according to whether the peak of the transmission signal exceeds (for example but not limited to "smaller than") a receiving peak threshold RX_vpp_TH. If it is determined that a result of the step S500 is yes, proceeding to the power supply procedure S700. As shown in FIG. 12G, the embodiment shown in FIG. 12G is similar to the embodiment shown in FIG. 12F, but is different in that: this embodiment shown in FIG. 12G replaces the step S500 by a step S600. To be more specific, the step S600 includes: determining whether the wireless power receiver circuit is present according to whether the peak-frequency variation rate which reflects change rate of the peak of the transmission signal against the operation frequency exceeds (for example but not limited to "smaller than") a receiving variation rate threshold RX_slope_TH. The rest steps of this embodiment shown in FIG. 12G are similar to the embodiment shown in FIG. 12F, so the details thereof are not redundantly repeated here.

Figure 12H:
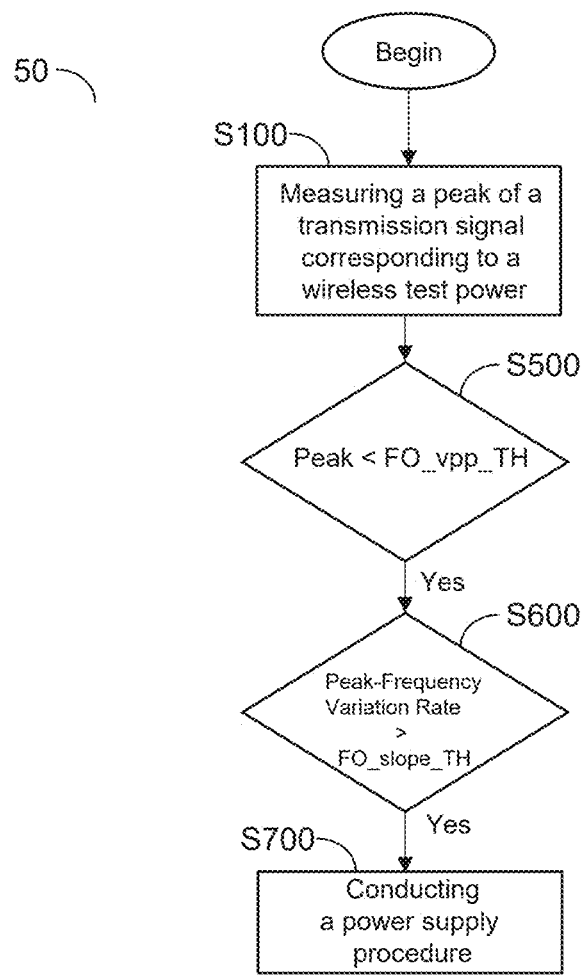
Figure 12I:
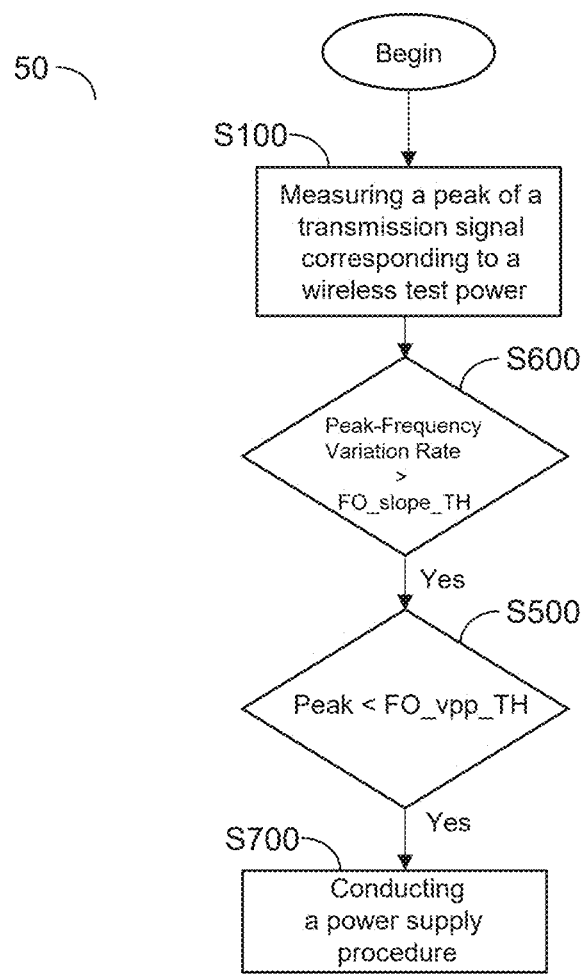

As shown in FIG. 12H, the embodiment shown in FIG. 12H is similar to the embodiment shown in FIG. 12F, but is different in that: this embodiment shown in FIG. 12H, subsequent to a step S500, further includes: a step S600. To be more specific, the step S600 includes: determining whether the wireless power receiver circuit is present according to whether the peak-frequency variation rate which reflects change rate of the peak of the transmission signal against the operation frequency is smaller than a receiving variation rate threshold RX_slope_TH. The rest steps of this embodiment shown in FIG. 12H are similar to the embodiment shown in FIG. 12F, so the details thereof are not redundantly repeated here. As shown in FIG. 12I, the embodiment shown in FIG. 12I is similar to the embodiment shown in FIG. 12F, but is different in that: this embodiment shown in 12I, prior to a step S500 and subsequent to a step S100, further includes: a step S600. To be more specific, the step S600 includes: determining whether the wireless power receiver circuit is present according to whether the peak-frequency variation rate which reflects change rate of the peak of the transmission signal against the operation frequency is smaller than a receiving variation rate threshold RX_slope_TH. If it is determined that a result of the step S600 is yes, proceeding to the step S500. The rest steps of this embodiment shown in FIG. 12I are similar to the embodiment shown in FIG. 12F, so the details thereof are not redundantly repeated here.

Figure 12J:
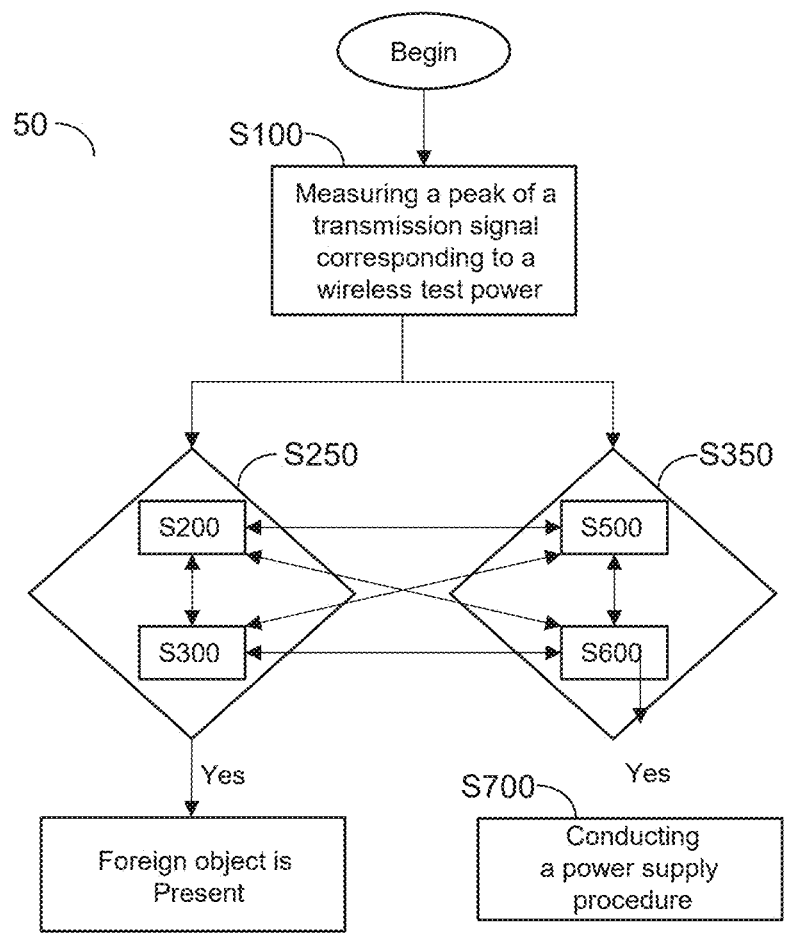

As shown in FIG. 12J, the embodiment shown in FIG. 12J is similar to the embodiment shown in 12A, but is different in that: firstly, a step S250 of this embodiment shown in FIG. 12J further includes: a step S200 and a step S300. Secondly, a step S350 of this embodiment shown in FIG. 12J further includes: a step S500 and a step S600. To be more specific, the step S200 of this embodiment shown in FIG. 12J includes: determining whether the foreign object is present according to whether the peak of the transmission signal is greater than a foreign object peak threshold FO_vpp_TH. To be more specific, the step S300 of this embodiment shown in FIG. 12J includes: determining whether the foreign object is present according to whether a peak-frequency variation rate which reflects change rate of the peak of the transmission signal against the operation frequency is greater than a foreign object variation rate threshold FO_slope_TH. To be more specific, the step S500 of this embodiment shown in FIG. 12J includes: determining whether the wireless power receiver circuit is present according to whether the peak of the transmission signal is smaller than a receiving peak threshold RX_vpp_TH. To be more specific, the step S600 of this embodiment shown in FIG. 12J includes: determining whether the wireless power receiver circuit is present according to whether the peak-frequency variation rate which reflects change rate of the peak of the transmission signal against the operation frequency is smaller than a receiving variation rate threshold RX_slope_TH. As shown in FIG. 12J, an execution sequence of the step S200, the step S300, the step S500 and the step S600 can be implemented as various embodiments. For example, the execution sequence can be: S200, S300, S600, S500 and eventually proceeding to the power supply procedure S700. For another example, the execution sequence can be: S300, S200, S600, S500 and eventually proceeding to the power supply procedure S700. For yet another example, the execution sequence can be: S200, S300, S500, S600 and eventually proceeding to the power supply procedure S700. For still another example, the execution sequence can be: S300, S200, S500, S600 and eventually proceeding to the power supply procedure S700. The rest steps of this embodiment shown in FIG. 12J are similar to the embodiment shown in FIG. 12A, so the details thereof are not redundantly repeated here.

Figure 13A:
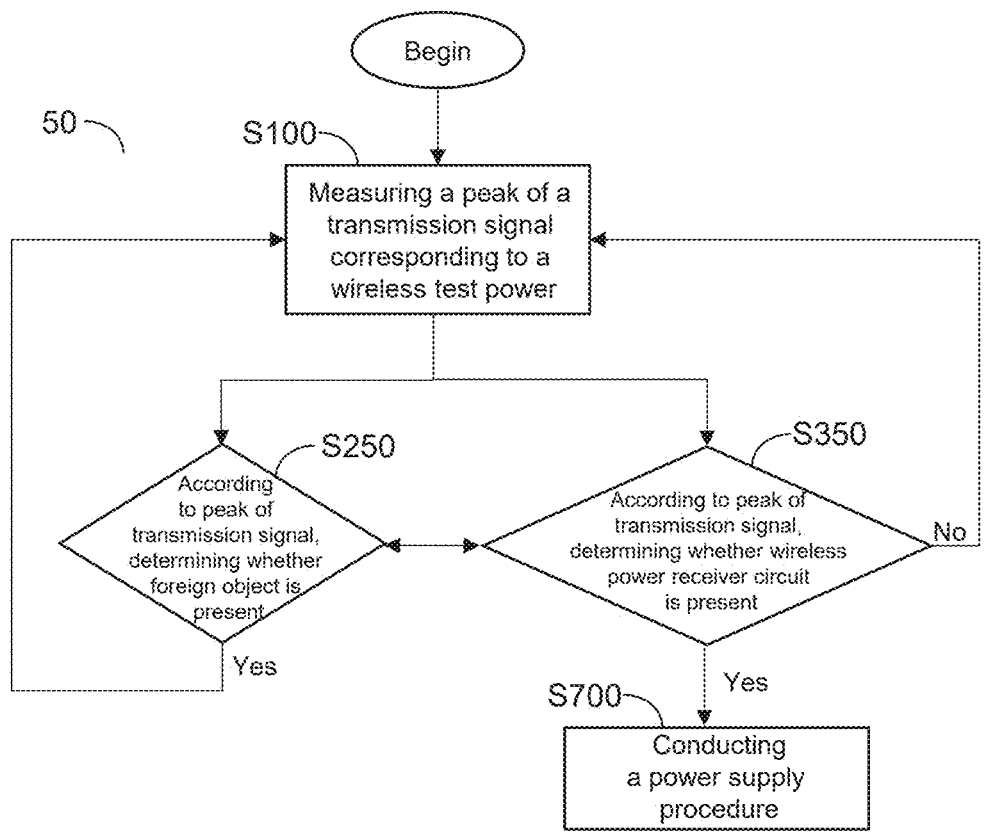
Figure 13B:
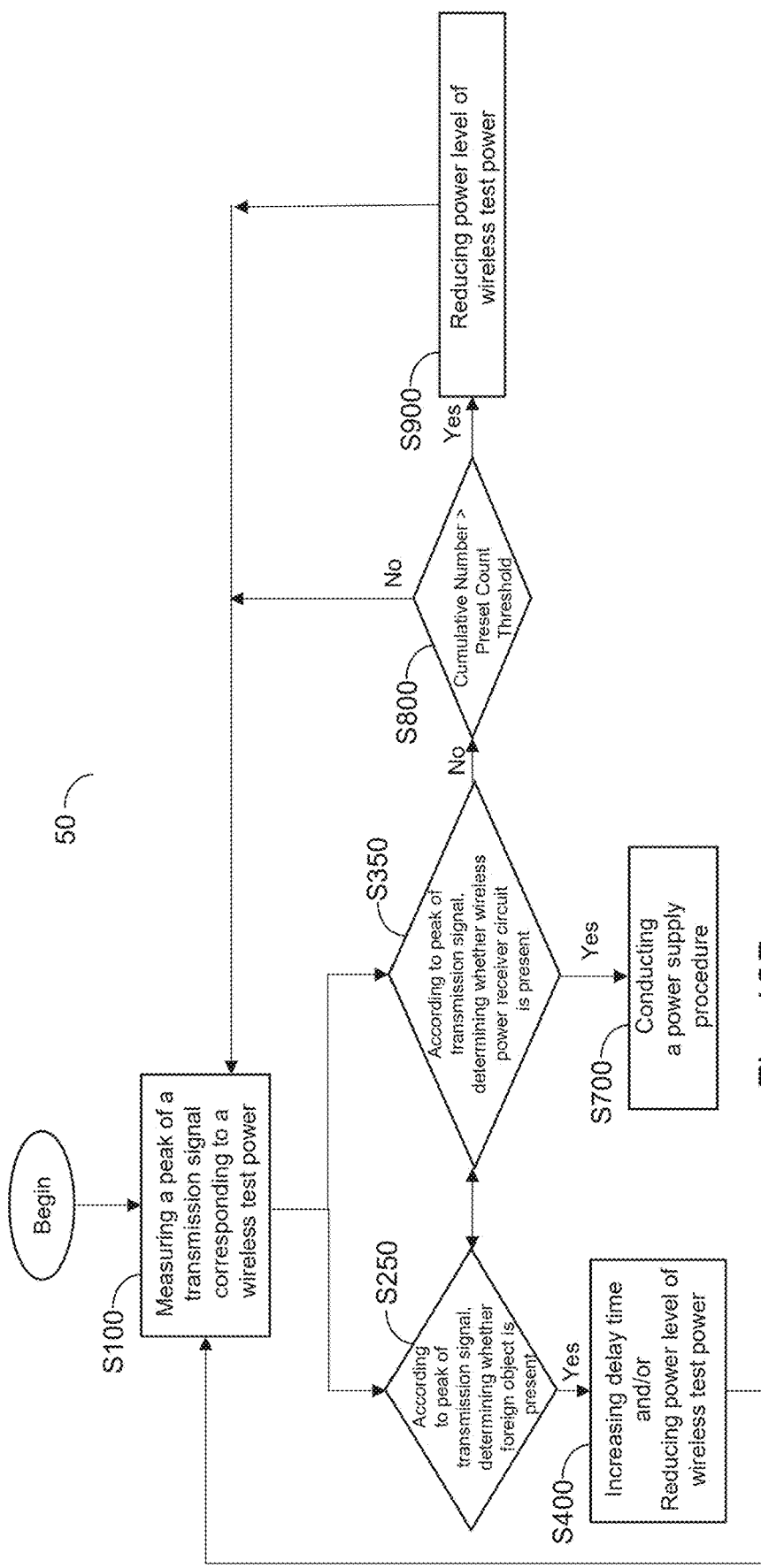

As shown in FIG. 13A, the embodiment shown in FIG. 13A is similar to the embodiment shown in 12A, but is different in that: firstly, if a determination result of a step S250 of this embodiment shown in FIG. 13A is yes, returning to the step S100. Secondly, if a determination result of a step S350 of this embodiment shown in FIG. 13A is no and if the step S250 of this embodiment shown in FIG. 13A has been conducted, returning to the step S100. The rest steps of this embodiment shown are FIG. 13A is similar to the embodiment shown in FIG. 12A, so the details thereof are not redundantly repeated here. As shown in FIG. 13B, the embodiment shown in FIG. 13B is similar to the embodiment shown in FIG. 13A, but is different in that: firstly, if a determination result of a step S250 of this embodiment shown in FIG. 13B is yes, this embodiment will firstly execute a foreign object operation step S400, and subsequently returning to the step S100. To be more specific, because the foreign object operation step S400 determines that a foreign object is present, this embodiment can increase a delay time and/or reduce a power level of the wireless test power for saving power and protecting the wireless power transmitter circuit 20 for prolonging the life time of the wireless power transmitter circuit 20. A second difference between this embodiment shown in FIG. 13B and the embodiment shown in 13A lies in that: if a determination result of a step S350 of this embodiment shown in FIG. 13B is no and if the step S250 of this embodiment shown in FIG. 13B has been conducted, proceeding to the step S800. To be more specific, the step S800 includes: accumulating a cumulative number; and entering the step S900 if the cumulative number is greater than a preset count threshold, or otherwise returning to the step S100. To be more specific, the step S900 includes: increasing a power level of the wireless test power before returning to the step S100. The rest steps of this embodiment shown in FIG. 13B are similar to the embodiment shown in FIG. 13A, so the details thereof are not redundantly repeated here.

Figure 14:
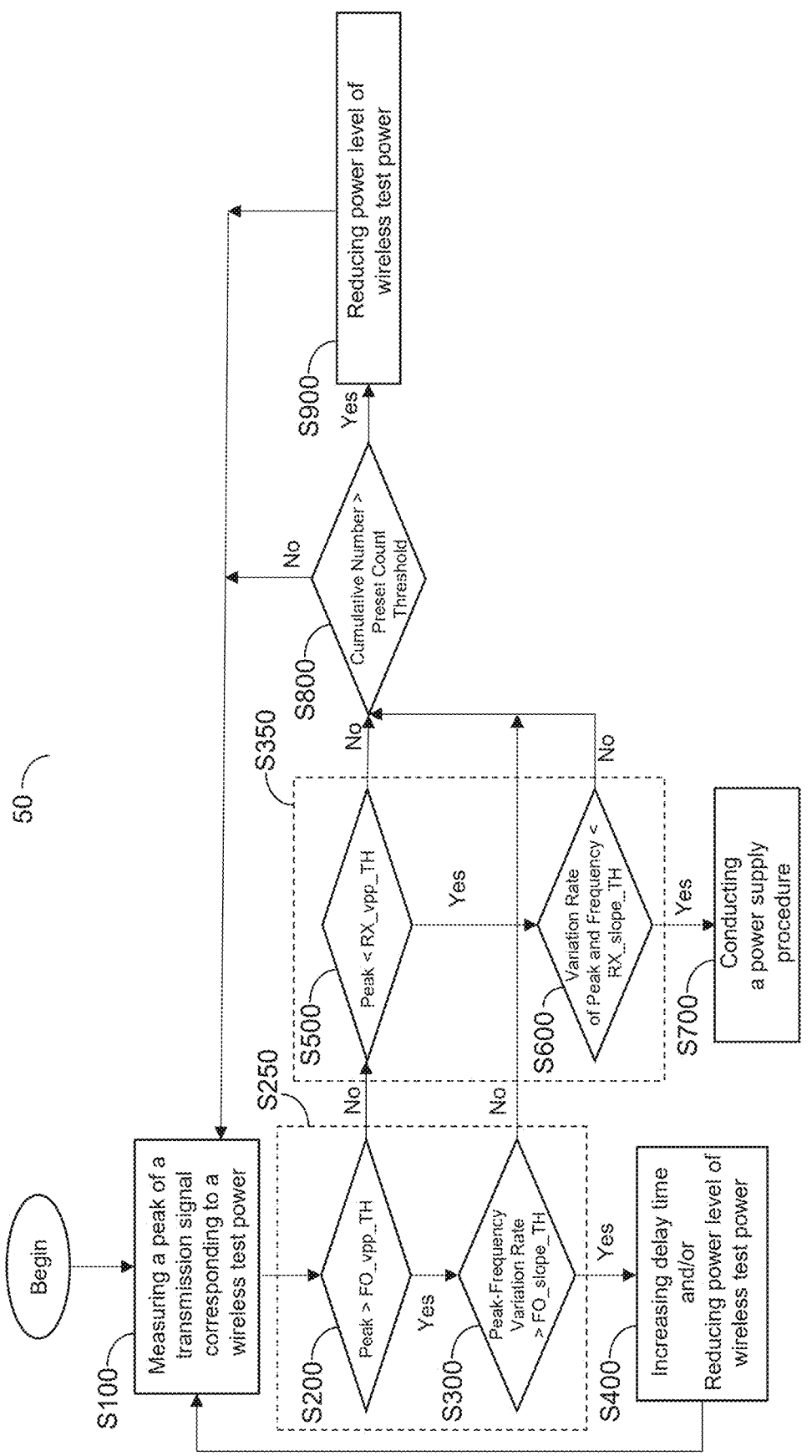

As shown in FIG. 14, the embodiment shown in FIG. 14 is similar to the embodiment shown in FIG. 13B, but is different in that: firstly, the step S250 of this embodiment shown in FIG. 14 further includes: a step S200 and a step S300. Secondly, the step S350 of this embodiment shown in FIG. 14 further includes: a step S500 and a step S600. To be more specific, the step S200 of this embodiment shown in FIG. 14 includes: determining whether the foreign object is present according to whether the peak of the transmission signal is greater than a foreign object peak threshold FO_vpp_TH. If it is determined that a result of the step S200 is yes, proceeding to the step S300. If it is determined that a result of the step S200 is no, proceeding to the step S500. To be more specific, the step S300 of this embodiment shown in FIG. 14 includes: determining whether the foreign object is present according to whether a peak-frequency variation rate which reflects change rate of the peak of the transmission signal against the operation frequency exceeds (for example but not limited to "greater than") a foreign object variation rate threshold FO_slope_TH. If it is determined that a result of the step S300 is yes, proceeding to the step S400. If it is determined that a result of the step S300 is no, proceeding to the step S800. To be more specific, the step S500 of this embodiment shown in FIG. 14 includes: determining whether the wireless power receiver circuit is present according to whether the peak of the transmission signal is smaller than a receiving peak threshold RX_vpp_TH. If it is determined that a result of the step S500 is yes, proceeding to the step S600. If it is determined that a result of the step S500 is no, proceeding to the step S800. To be more specific, the step S600 of this embodiment shown in FIG. 14 includes: determining whether the wireless power receiver circuit is present according to whether the peak-frequency variation rate which reflects change rate of the peak of the transmission signal against the operation frequency is smaller than a receiving variation rate threshold RX_slope_TH. If it is determined that a result of the step S600 is yes, proceeding to the step S700. If it is determined that a result of the step S600 is no, proceeding to the step S800. The rest steps of this embodiment shown in FIG. 14 are similar to the embodiment shown in FIG. 13B, so the details thereof are not redundantly repeated here.

Figure 15:
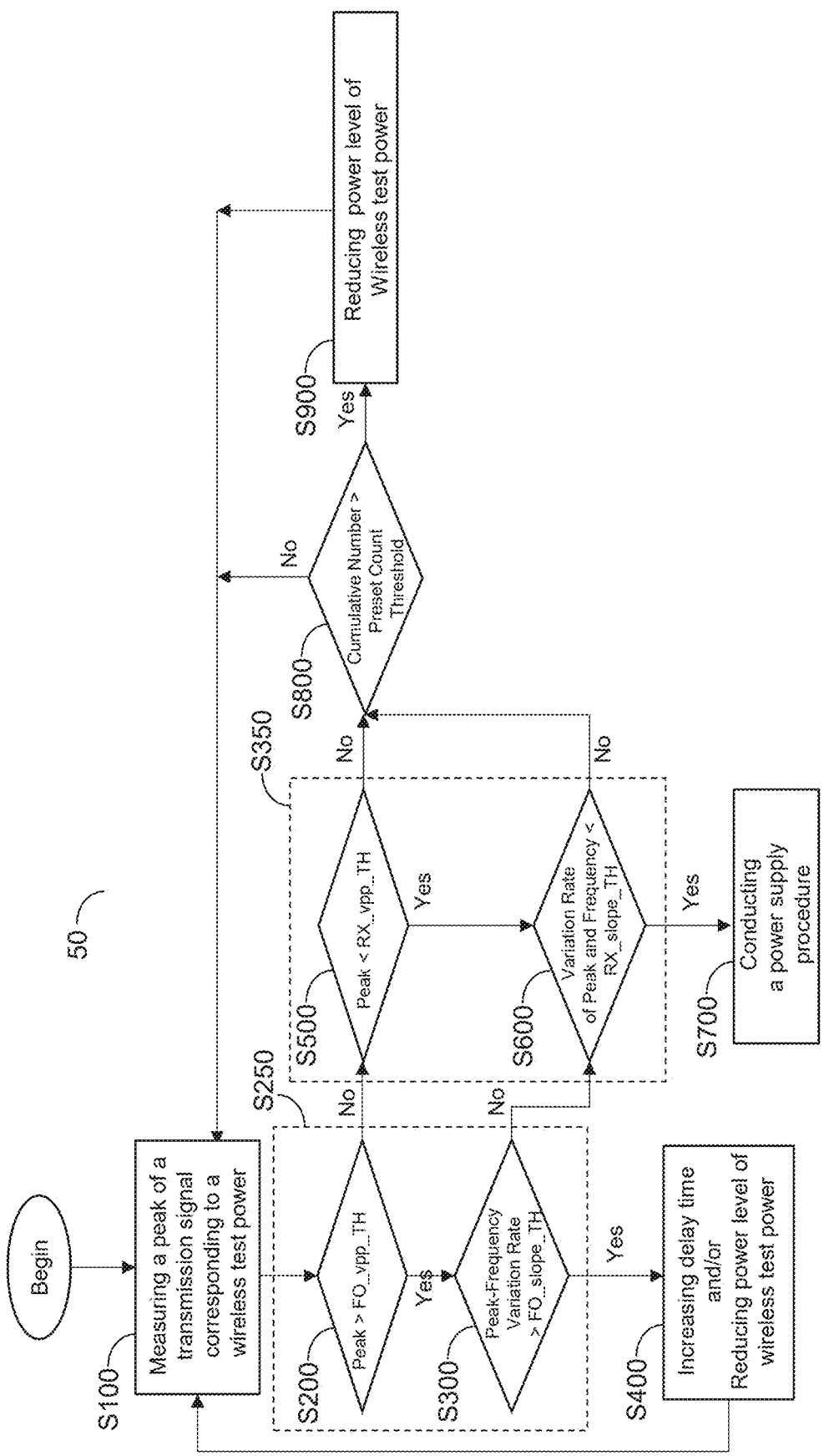

As shown in FIG. 15, the embodiment shown in FIG. 15 is similar to the embodiment shown in FIG. 14, but is different in that: if a determination result of a step S300 of this embodiment shown in FIG. 14 is no, proceeding to a step S600. The rest steps of this embodiment shown in FIG. 15 are similar to the embodiment shown in FIG. 14, so the details thereof are not redundantly repeated here.

As fully described above, the present invention proposes a wireless power receiver circuit which adopts a peak of a transmission signal or a peak-frequency variation rate of the transmission signal to detect a foreign object and a wireless power receiver circuit, without exploiting auxilliary detection winding circuitries. Besides, since the present invention can detect a stable peak transmitted by a low power without awakening a wireless power receiver circuit, the present invention can provide an analog groping procedure capable of performing a precise detection with power saving prior to executing a digital groping procedure.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the aforementioned, the spirit of the present invention should cover all such and other modifications and variations, which should be interpreted to fall within the scope of the following claims and their equivalents.

What is claimed is:

1. A wireless power transmitter circuit, comprising:
    an inverter circuit which includes a plurality of switches, wherein the inverter circuit is coupled to a resonant transmitter circuit, wherein the resonant transmitter circuit includes: a transmission winding and a resonant capacitor which are coupled to each other; and
    a transmitter controller circuit, which is configured to operably generate a pulse width modulation (PWM) control signal, so as to control the plurality of switches, thus generating a wireless transmission power via the resonant transmitter circuit in a power supply procedure (S700), so that a wireless power supply is accordingly provided to a corresponding wireless power receiver circuit, wherein in a groping procedure, the transmitter controller circuit is further configured to operably control the plurality of switches to generate a wireless test power via the resonant transmitter circuit based upon an operation frequency;
    wherein according to a transmission signal, the transmitter controller circuit is further configured to operably determine whether a foreign object is present and/or whether the wireless power receiver circuit is present, wherein the transmission signal is related to a voltage in between the resonant capacitor and the transmission winding;
    wherein there is an offset frequency, which is not equal to zero, between the operation frequency and an intrinsic resonant frequency of the resonant transmitter circuit;
    wherein the groping procedure includes the following steps:
    a step (S100): measuring a peak of the transmission signal corresponding to the wireless test power;
    wherein the groping procedure further includes the following steps:
    a step (S250): determining whether the foreign object is present according to the peak of the transmission signal; and/or
    a step (S350): determining whether the wireless power receiver circuit is present according to the peak of the transmission signal, wherein when it is determined that the wireless power receiver circuit is indeed present, performing the power supply procedure (S700);
    wherein the step (S250) includes the following steps:
        a step (S200): determining whether the foreign object is present according to whether the peak of the transmission signal exceeds a foreign object peak threshold; and/or
        a step (S300): determining whether the foreign object is present according to whether a peak-frequency variation rate which reflects change rate of the peak of the transmission signal against the operation frequency exceeds a foreign object variation rate threshold.

2. The wireless power transmitter circuit as claimed in claim 1, wherein the step (S350) includes the following steps:
    a step (S500): determining whether the wireless power receiver circuit is present according to whether the peak of the transmission signal exceeds a receiving peak threshold; and/or
    a step (S600): determining whether the wireless power receiver circuit is present according to whether the peak-frequency variation rate which reflects change rate of the peak of the transmission signal against the operation frequency exceeds a receiving variation rate threshold.

3. The wireless power transmitter circuit as claimed in claim 2, wherein when the foreign object is present, the resonant transmitter circuit has a first response resonant frequency, and, when the wireless power receiver circuit is present, the resonant transmitter circuit has a second response resonant frequency, wherein the first response resonant frequency and the second response resonant frequency are respectively located at opposite sides of the intrinsic resonant frequency.

4. The wireless power transmitter circuit as claimed in claim 3, wherein the first response resonant frequency is higher than the intrinsic resonant frequency, and, the intrinsic resonant frequency is higher than the second response resonant frequency.

5. The wireless power transmitter circuit as claimed in claim 4, wherein:
    the step (S200) further includes the following steps: determining whether the foreign object is present according to whether the peak of the transmission signal is greater than the foreign object peak threshold; and
    the step (S500) further includes the following steps: determining whether the wireless power receiver circuit is present according to whether the peak of the transmission signal is smaller than the receiving peak threshold;
    wherein the receiving peak threshold is smaller than the foreign object peak threshold.

6. The wireless power transmitter circuit as claimed in claim 4, wherein:
the step (S300) further includes the following steps: determining whether the foreign object is present according to whether an absolute value of the peak-frequency variation rate which reflects change rate of the peak of the transmission signal against the operation frequency is greater than an absolute value of the foreign object variation rate threshold; and
the step (S600) further includes the following steps: determining whether the wireless power receiver circuit is present according to whether an absolute value of the peak of the transmission signal is smaller than an absolute value of the receiving peak threshold;
wherein the absolute value of the receiving peak threshold is smaller than the absolute value of the foreign object peak threshold.

7. The wireless power transmitter circuit as claimed in claim 2, wherein the peak-frequency variation rate which reflects change rate of the peak of the transmission signal against the operation frequency is a quotient of a first difference divided by a second difference, wherein the first difference is a difference between a peak of a first transmission signal corresponding to a first operation frequency and a peak of a second transmission signal corresponding to a second operation frequency, and the second difference is a difference between the first operation frequency and the second operation frequency.

8. The wireless power transmitter circuit as claimed in claim 7, wherein the first operation frequency is same as the operation frequency, such that the first transmission signal peak is the peak of the transmission signal.

9. The wireless power transmitter circuit as claimed in claim 1, wherein when the step (S250) determines that the foreign object is present, returning to the step (S100).

10. The wireless power transmitter circuit as claimed in claim 9, wherein the groping procedure further includes the following steps:
a foreign object operation step (S400), wherein when the step (S250) determines that the foreign object is present, the foreign object operation step (S400) is further performed before returning to the step (S100), wherein the foreign object operation step (S400) includes the following steps:
adding a delay time; and/or
reducing a power level of the wireless test power.

11. The wireless power transmitter circuit as claimed in claim 2, wherein when the step (S300) determines that the foreign object is absent and the step (S600) determines that the wireless power receiver circuit is absent, returning to the step (S100).

12. The wireless power transmitter circuit as claimed in claim 11, wherein the groping procedure further includes the following steps:
a step (S900), wherein when the step (S300) determines that the foreign object is absent and the step (S600) determines that the wireless power receiver circuit is absent, the step (S900) is further performed before returning to the step (S100), wherein the step (S900) includes the following steps:
increasing a power level of the wireless test power.

13. The wireless power transmitter circuit as claimed in claim 12, wherein the groping procedure further includes the following steps:
a step (S800), wherein when the step (S300) determines that the foreign object is absent and the step (S600) determines that the wireless power receiver circuit is absent, the step (S800) is further performed before returning to the step (S100) or entering the step (S900), wherein the step (S800) includes the following steps:
accumulating a cumulative number; and
entering the step (S900) if the cumulative number is greater than a preset count threshold, or otherwise returning to the step (S100).

14. A method, which is configured to operably detect a wireless power receiver circuit and a foreign object; the method comprising the following steps:
in a power supply procedure (S700), controlling a resonant transmitter circuit to generate a wireless transmission power, so that a wireless power supply is accordingly provided to a corresponding wireless power receiver circuit; and
in a groping procedure, controlling a resonant transmitter circuit to generate a wireless test power based upon an operation frequency; and determining whether a foreign object is present and/or whether the wireless power receiver circuit is present according to a transmission signal of the resonant transmitter circuit;
wherein there is an offset frequency, which is not equal to zero, between the operation frequency and an intrinsic resonant frequency of the resonant transmitter circuit;
wherein the groping procedure includes the following steps:
a step (S100): measuring a peak of the transmission signal corresponding to the wireless test power;
wherein the groping procedure further includes the following steps:
a step (S250): determining whether the foreign object is present according to the peak of the transmission signal; and/or
a step (S350): determining whether the wireless power receiver circuit is present according to the peak of the transmission signal, wherein when it is determined that the wireless power receiver circuit is indeed present, performing the power supply procedure (S700);
wherein the step (S250) includes the following steps:
a step (S200): determining whether the foreign object is present according to whether the peak of the transmission signal exceeds a foreign object peak threshold; and/or
a step (S300): determining whether the foreign object is present according to whether a peak-frequency variation rate which reflects change rate of the peak of the transmission signal against the operation frequency exceeds a foreign object variation rate threshold.

15. The method as claimed in claim 14, wherein the step (S350) includes the following steps:
a step (S500): determining whether the wireless power receiver circuit is present according to whether the peak of the transmission signal exceeds a receiving peak threshold; and/or
a step (S600): determining whether the wireless power receiver circuit is present according to whether the peak-frequency variation rate which reflects change rate of the peak of the transmission signal against the operation frequency exceeds a receiving variation rate threshold.

16. The method as claimed in claim 15, wherein when the foreign object is present, the resonant transmitter circuit has a first response resonant frequency, and, when the wireless power receiver circuit is present, the resonant transmitter circuit has a second response resonant frequency, wherein the first response resonant frequency and the second response resonant frequency are respectively located at opposite sides of the intrinsic resonant frequency.

17. The method as claimed in claim 16, wherein the first response resonant frequency is higher than the intrinsic resonant frequency, and, the intrinsic resonant frequency is higher than the second response resonant frequency.

18. The method as claimed in claim 17, wherein:
the step (S200) further includes the following steps:
determining whether the foreign object is present according to whether the peak of the transmission signal is greater than the foreign object peak threshold; and
the step (S500) further includes the following steps:
determining whether the wireless power receiver circuit is present according to whether the peak of the transmission signal is smaller than the receiving peak threshold;
wherein the receiving peak threshold is smaller than the foreign object peak threshold.

19. The method as claimed in claim 17, wherein:
the step (S300) further includes the following steps:
determining whether the foreign object is present according to whether an absolute value of the peak-frequency variation rate which reflects change rate of the peak of the transmission signal against the operation frequency is greater than an absolute value of the foreign object variation rate threshold; and
the step (S600) further includes the following steps:
determining whether the wireless power receiver circuit is present according to whether an absolute value of the peak of the transmission signal is smaller than an absolute value of the receiving peak threshold;
wherein the absolute value of the receiving peak threshold is smaller than the absolute value of the foreign object peak threshold.

20. The method as claimed in claim 15, wherein the peak-frequency variation rate which reflects change rate of the peak of the transmission signal against the operation frequency is a quotient of a first difference divided by a second difference, wherein the first difference is a difference between a peak of a first transmission signal corresponding to a first operation frequency and a peak of a second transmission signal corresponding to a second operation frequency, wherein the second difference is a difference between the first operation frequency and the second operation frequency.

21. The method as claimed in claim 20, wherein the first operation frequency is same as the operation frequency, such that the first transmission signal peak is the peak of the transmission signal.

22. The method as claimed in claim 14, wherein when the step (S250) determines that the foreign object is present, returning to the step (S100).

23. The method as claimed in claim 22, wherein the groping procedure further includes the following steps:
a foreign object operation step (S400), wherein when the step (S250) determines that the foreign object is present, the foreign object operation step (S400) is further performed before returning to the step (S100), wherein the foreign object operation step (S400) includes the following steps:
adding a delay time; and/or
reducing a power level of the wireless test power.

24. The method as claimed in claim 15, wherein when the step (S300) determines that the foreign object is absent and the step (S600) determines that the wireless power receiver circuit is absent, returning to the step (S100).

25. The method as claimed in claim 24, wherein the groping procedure further includes the following steps:
a step (S900), wherein when the step (S300) determines that the foreign object is absent and the step (S600) determines that the wireless power receiver circuit is absent, the step (S900) is further performed before returning to the step (S100), wherein the step (S900) includes the following steps:
increasing a power level of the wireless test power.

26. The method as claimed in claim 25, wherein the groping procedure further includes the following steps:
a step (S800), wherein when the step (S300) determines that the foreign object is absent and the step (S600) determines that the wireless power receiver circuit is absent, the step (S800) is further performed before returning to the step (S100) or entering the step (S900), wherein the step (S800) includes the following steps:
accumulating a cumulative number; and
entering the step (S900) if the cumulative number is greater than a preset count threshold, or otherwise returning to the step (S100).

* * * * *